United States Patent
Mizuno et al.

(10) Patent No.: US 12,034,269 B2
(45) Date of Patent: Jul. 9, 2024

(54) LIGHT AMPLIFYING RELAY SYSTEM

(71) Applicant: NIPPON TELEGRAPH AND TELEPHONE CORPORATION, Tokyo (JP)

(72) Inventors: Takayuki Mizuno, Tokyo (JP); Koki Shibahara, Tokyo (JP); Akira Isoda, Tokyo (JP); Takayuki Kobayashi, Tokyo (JP); Yutaka Miyamoto, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 828 days.

(21) Appl. No.: 17/258,408

(22) PCT Filed: Jul. 5, 2019

(86) PCT No.: PCT/JP2019/026852
§ 371 (c)(1),
(2) Date: Jan. 6, 2021

(87) PCT Pub. No.: WO2020/013096
PCT Pub. Date: Jan. 16, 2020

(65) Prior Publication Data
US 2021/0296847 A1    Sep. 23, 2021

(30) Foreign Application Priority Data
Jul. 12, 2018 (JP) .................. 2018-132530

(51) Int. Cl.
*H01S 3/067* (2006.01)
*H01S 3/094* (2006.01)
(Continued)

(52) U.S. Cl.
CPC ............ *H01S 3/30* (2013.01); *H01S 3/06737* (2013.01); *H01S 3/06779* (2013.01);
(Continued)

(58) Field of Classification Search
CPC .. H01S 3/06754; H01S 3/10015; H01S 3/235; H04B 10/2581; H04B 10/2916; H04J 14/04
See application file for complete search history.

(56) References Cited

U.S. PATENT DOCUMENTS 6,282,361 B1 *  8/2001  Nishimura ......... G02B 6/12021
                                                           385/5
2009/0022499 A1 *  1/2009  Roy .................... G02B 6/4246
                                                          398/158
(Continued)

FOREIGN PATENT DOCUMENTS

JP    2007028673 A  *  2/2007
JP    2016042164 A      3/2016
(Continued)

OTHER PUBLICATIONS

R. Ryf et al., 72-Tb/s Transmission over 179-km All-Fiber 6-Mode Span with Two Cladding Pumped In-Line Amplifiers, Ecoc 2015, Tu.3.2.2.
(Continued)

*Primary Examiner* — Michael Carter
(74) *Attorney, Agent, or Firm* — Harness, Dickey & Pierce, P.L.C.

(57) ABSTRACT

An optical amplifier repeater system includes an optical fiber propagating a light beam in a plurality of propagation modes and an optical amplifier repeater amplifying the light beam propagated through the optical fiber. The optical amplifier repeater includes an optical demultiplexer demultiplexing the light beam in the plurality of propagation modes propa-
(Continued)

gated through the optical fiber into a plurality of single-mode light beams, an optical amplifier amplifying, by simultaneous pumping, intensities of the plurality of single-mode light beams using a light beam generated by one pumping light source, an optical multiplexer multiplexing the plurality of single-mode light beams amplified by the optical amplifier into a light beam in the plurality of propagation modes, and an optical intensity adjusting unit adjusting the intensity of each of the plurality of single-mode light beams at least one of before or after the amplification by the optical amplifier. The optical intensity adjusting unit performs the adjustment by amplifying or attenuating the optical intensity of each of the plurality of single-mode light beams in an individual optical path through which the single-mode light beam is propagated.

7 Claims, 23 Drawing Sheets

(51) Int. Cl.
| | |
|---|---|
| *H01S 3/10* | (2006.01) |
| *H01S 3/30* | (2006.01) |
| *H04B 10/2581* | (2013.01) |
| *H04B 10/291* | (2013.01) |
| *H04B 10/293* | (2013.01) |
| *H04J 14/04* | (2006.01) |

(52) U.S. Cl.
CPC .... *H01S 3/094007* (2013.01); *H01S 3/10015* (2013.01); *H04B 10/2581* (2013.01); *H04B 10/2916* (2013.01); *H04B 10/293* (2013.01); *H04J 14/04* (2013.01)

(56) References Cited

U.S. PATENT DOCUMENTS

| | | | |
|---|---|---|---|
| 2015/0085352 | A1 | 3/2015 | Ryf et al. |
| 2016/0054519 | A1 | 2/2016 | Onaka |

FOREIGN PATENT DOCUMENTS

| | | | |
|---|---|---|---|
| JP | 2016167762 A | | 9/2016 |
| JP | 2016219753 A | | 12/2016 |
| JP | 2017021070 A | | 1/2017 |
| JP | 2017191185 A | * | 10/2017 |

OTHER PUBLICATIONS

R. Ryf et al., Long-Distance Transmission over Coupled-Core Multicore Fiber, ECOC 2016, Post Deadline, 42nd European Conference and Exhibition on Optical Communications, 2016.
R. Ryf et al., Distributed Raman Amplification based Transmission over 1050-km Few-Mode Fiber, in Proc., Ecoc 2015, Tu.3.2.3.

* cited by examiner

LIGHT AMPLIFYING RELAY SYSTEM

CROSS-REFERENCE TO RELATED APPLICATIONS

This application is a 371 U.S. National Phase of International Application No. PCT/JP2019/026852 filed on Jul. 5, 2019, which claims priority to Japanese Application No. 2018-132530 filed on Jul. 12, 2018. The entire disclosures of the above applications are incorporated herein by reference.

TECHNICAL FIELD

The present disclosure relates to an optical amplifier repeater system.

BACKGROUND ART

With the rapid development of broadband services associated with the recent widespread optical fiber communication, communication capacity continues to increase every year. In response to the rapid increase in the communication capacity, a large capacity optical network has been achieved by increasing the capacity of an optical communication system device without changing the structure of an optical fiber. Optical fibers that serve as the base of current high-capacity optical networks are each configured to have one core as an optical signal path of single-mode light in one optical fiber, and an optical network that transmits a volume of 1 terabit per second over a long distance has been implemented. However, there is a demand for further increasing the communication capacity owing to a recent increase rate in the communication capacity.

As a means for increasing the communication capacity, it is conceivable to increase the number of optical fibers. In transmitting an optical signal from an optical transmitter to an optical receiver, a transmission capacity can be made N times larger by increasing the number of optical fibers from one to N. Alternatively, as another means, space division multiplexing optical communication technologies are under study that are based on a mode-multiplexing transmission in which light in a plurality of propagation modes is propagated through one optical fiber. The number of modes for light propagated through one optical fiber can be set to M (M is an integer of two or more) to multiplex signals and make a capacity capable of transmission M times. Examples reported as an optical transmission line used in the mode-multiplexing transmission include a multi-mode optical fiber, a few-mode optical fiber having the number M of propagation modes of about 2 to 15, and a coupled core optical fiber.

As an optical signal is propagated through an optical fiber, an optical intensity decreases in proportion to the distance and a signal quality decreases. Thus, the optical intensity needs to be amplified at every certain distance. A typical propagation loss of a single-mode optical fiber currently used is around 0.2 dB per km, and thus the optical intensity is reduced by half every a little over 10 km propagation. Then, in the optical amplifier repeater system, an optical amplifier is installed at a distance of several tens of km so that the optical intensity exceeds a predetermined value at which the signal quality can be maintained. To increase the number of propagation modes used in optical fiber optical transmission lines as described above, it is necessary to amplify the optical intensities in a plurality of propagation modes and increase the capacity of the optical amplifier repeater system. As such, various optical amplifier repeater systems are under study that support optical fiber transmission lines for propagating a plurality of propagation modes.

First Example of Related Art

FIG. 22 is a diagram illustrating an example of a conventional optical amplifier repeater system 91 provided with an optical transmission line that includes an optical fiber that propagates light in a plurality of propagation modes (hereinafter, also referred to as "modes") and optical amplifier repeaters. This conventional optical amplifier repeater system 91 includes optical transmitters 901-1 to 901-6, a multi-mode optical multiplexer 941, an optical transmission line 991, a multi-mode optical demultiplexer 942, and optical receivers 911-1 to 911-6. The optical transmission line 991 includes multi-mode optical fibers 971-1 to 971-P (P is three in the figure) for propagating a plurality of modes, and optical amplifier repeaters 931-1 to 931-Q (Q is two in the figure). The optical amplifier repeater 931-$q$ (where q is an integer of one or more and Q or less) includes a multi-mode optical amplifier 921-$q$ that amplifies the optical intensities in a plurality of propagation modes. In the optical amplifier repeater system 91, the optical signals transmitted by the optical transmitters 901-1 to 901-6 are relayed through the optical transmission line 991 and received by the optical receivers 911-1 to 911-6.

In NPL 1, six modes of LP01, LP11a, LP11b, LP21a, LP21b, and LP02 are used, and graded index 4LP-mode fibers approximately 60 km long are used as optical fiber transmission lines (multi-mode optical fibers 971-1 to 971-P). The multi-mode optical multiplexer 941 functions to multiplex a plurality of optical signals into an optical signal in a plurality of propagation modes (the number of modes M is six). The multiplexed optical signal is transmitted through the multi-mode optical fiber 971-1, and thereafter, an optical signal intensity in the plurality of propagation modes is amplified in a state of the light by the multi-mode optical amplifier 921-1 in the optical amplifier repeater 931-1, and the optical signal is transmitted to the multi-mode optical fiber 971-2. Examples of the multi-mode optical amplifiers 921-1 to 921-Q include a multi-mode erbium-doped fiber amplifier (EDFA) using a multi-mode erbium-doped fiber (EDF) as an amplification medium (for example, see NPL 1). When the optical signal through such transmission and relay repeated arrives at a reception end, the optical signal is demultiplexed into respective modes by the multi-mode optical demultiplexer 942 and individually received by the optical receivers 911-1 to 911-6, and then, the optical signal is demodulated.

Second Example of Related Art

FIG. 23 is a diagram illustrating an example of a conventional optical amplifier repeater system 92 provided with an optical transmission line that includes an optical fiber for propagating a plurality of propagation modes and optical amplifier repeaters (for example, see NPL 2). The optical amplifier repeater system 92 includes optical transmitters 901-1 to 901-4, a multi-mode optical multiplexer 941, an optical amplifier unit 932$a$ including optical amplifiers 922-1 to 922-4, optical transmission lines 992-1 to 992-P (P is two in the figure), one or more optical amplifier repeaters 935, a multi-mode optical demultiplexer 942, an optical amplifier unit 932$b$ including optical amplifiers 924-1 to 924-4, and optical receivers 911-1 to 911-4. The optical transmission line 992-$p$ (where p is an integer of one or more and P or less) includes coupled core fibers 972-1 to 972-2.

The optical amplifier repeater 935 includes a multi-mode optical demultiplexer 943, an optical amplifiers 923-1 to 923-4, and a multi-mode optical multiplexer 944. The optical amplifier repeater system 92 is characterized in that the optical signals of respective cores in a coupled core type multi-core fiber transmission in which the optical signals of a plurality of cores are optically coupled during propagation are amplified by the conventional EDFA (optical amplifiers 922-1 to 922-4, 923-1 to 923-4, and 924-1 to 924-4).

Third Example of Related Art

FIG. 24 is a diagram illustrating an example of a conventional optical amplifier repeater system 93 provided with an optical transmission line that includes an optical fiber for propagating a plurality of propagation modes and optical amplifier repeaters (for example, see NPL 3). The optical amplifier repeater system 93 includes optical transmitters 901-1 to 901-3, an optical amplifier unit 933a, a multi-mode optical multiplexer 941, optical transmission lines 992-1 to 992-P (P is two in the figure), one or more optical amplifier repeaters 934, a multi-mode optical demultiplexer 942, an optical amplifier unit 933b, and optical receivers 911-1 to 911-3. The optical transmission line 992-p (where p is an integer of one or more and P or less) includes a multi-mode optical fiber 971-p.

The optical amplifier unit 933a includes optical amplifiers 925-1 to 925-3, wavelength multiplexers 951-1 to 951-2, and pumping light sources 961-1 to 961-2. The optical amplifier repeater 934 includes a multi-mode optical demultiplexer 943, wavelength multiplexers 951-3 to 951-4, pumping light sources 961-3 to 961-4, optical amplifiers 926-1 to 926-3, optical amplifiers 927-1 to 927-3, wavelength multiplexers 951-5 to 951-6, and pumping light sources 961-5 to 961-6. The optical amplifier unit 933b includes wavelength multiplexers 951-7 to 951-8, pumping light sources 961-7 to 961-8, and optical amplifiers 928-1 to 928-3. The optical amplifier repeater system 93 is characterized in that each of the propagation modes in the multi-mode fiber is amplified by the conventional EDFA (optical amplifiers 925-1 to 925-3, 926-1 to 926-3, 927-1 to 927-3, and 928-1 to 928-3), and is amplified by forward and backward pumping Raman (wavelength multiplexers 951-1 to 951-8 and pumping light sources 961-1 to 961-8).

CITATION LIST

Non Patent Literature

NPL 1: R. Ryf et al., "72-Tb/s Transmission over 179-km All-Fiber 6-Mode Span with Two Cladding Pumped In-Line Amplifiers", in Proc. ECOC 2015, 2015, Tu.3.2.2.

NPL 2: R. Ryf et al., "Long-Distance Transmission over Coupled-Core Multicore Fiber", ECOC 2016—Post Deadline 42nd European Conference and Exhibition on Optical Communications, 2016, p. 40-42

NPL 3: R. Ryf et al., "Distributed Raman Amplification based Transmission over 1050-km Few-Mode Fiber", in Proc. ECOC 2015, 2015, Tu.3.2.3.

SUMMARY OF THE INVENTION

Technical Problem

However, the related art has the following problems. Specifically, in the first example of the related art, an inter-mode loss difference (MDL) is generated in the transmission line and in the optical amplifier, so a transmission possible distance is limited by the lowest quality mode. In addition, in the second and third examples of the related art, a conventional optical amplifier is required for each mode, and the power consumption and the number of devices increase, which results in an increase in cost.

In view of the above, an object of the present disclosure is to provide an optical amplifier repeater system capable of long-distance and high-capacity communication while reducing cost by use of an optical fiber communication scheme adopting mode division multiplexing.

Means for Solving the Problem

An aspect of the present disclosure is an optical amplifier repeater system including an optical fiber propagating a light beam in a plurality of propagation modes, and an optical amplifier repeater amplifying the light beam, wherein the optical amplifier repeater includes an optical demultiplexer demultiplexing the light beam in the plurality of propagation modes propagated through the optical fiber into a plurality of single-mode light beams, an optical amplifier amplifying, by simultaneous pumping, intensities of the plurality of single-mode light beams using a light beam generated by one pumping light source, an optical multiplexer multiplexing the plurality of single-mode light beams amplified by the optical amplifier into a light beam in the plurality of propagation modes, and an optical intensity adjusting unit adjusting the intensity of each of the plurality of single-mode light beams at least one of before or after the amplification by the optical amplifier, and the optical intensity adjusting unit performs the adjustment by amplifying or attenuating the optical intensity of each of the plurality of single-mode light beams in an individual optical path through which the single-mode light beam is propagated.

An aspect of the present disclosure is the optical amplifier repeater system described above, wherein the optical intensity adjusting unit performs the adjustment by amplifying the optical intensity using a multi-channel optical amplifier, or by amplifying the optical intensity using a distributed Raman amplification.

An aspect of the present disclosure is the optical amplifier repeater system described above further including, on a plurality of the optical paths, an optical tap branching some of the optical intensities of the plurality of single-mode light beams propagated through the optical paths, wherein the optical intensity adjusting unit performs the adjustment in accordance with measurement results of the optical intensities that are branched by the optical tap.

An aspect of the present disclosure is the optical amplifier repeater system described above, wherein the optical fiber propagates a light beam the number of propagation modes of which is M, M being an integer of two or more, the optical amplifier is an N-channel cladding-pumped multi-core optical amplifier, N being an integer of two or more and being equal to or more than M, and the optical intensity adjusting unit is a core-pumped multi-core optical amplifier.

An aspect of the present disclosure is the optical amplifier repeater system described above, wherein the optical fiber propagates a light beam the number of propagation modes of which is M, M being an integer of two or more, the optical demultiplexer demultiplexes the light beam in the M propagation modes into N single-mode light beams, N being an integer of two or more, the optical multiplexer multiplexes the N single-mode light beams amplified by the optical amplifier into a light beam in the M propagation modes, the optical intensity adjusting unit includes a Raman amplification pumping light source outputting a pumping light beam having a wavelength different from an optical signal band of each of the single-mode light beams, and a Raman amplification wavelength multiplexer Raman-amplifying an optical intensity of the optical signal band by combining the light beam output by the Raman amplification pumping light source on each of the optical paths through which the respective N single-mode light beams are propagated, and an amplification amount by the Raman amplification is based on a characteristic difference in the optical paths through which the respective N single-mode light beams are propagated.

An aspect of the present disclosure is the optical amplifier repeater system described above, wherein the optical fiber includes a plurality of cores propagating a plurality of propagation modes, and the optical intensity adjusting unit performs the adjustment to reduce a difference in the optical intensity between the propagation modes and between the cores.

An aspect of the present disclosure is the optical amplifier repeater system described above, wherein the optical amplifier includes a plurality of input ports to each of which one of the single-mode light beams is input, and the optical demultiplexer inputs the plurality of single-mode light beams obtained by the demultiplexing to the different input ports of the optical amplifier to reduce variations in the optical intensity after the amplification by the optical amplifier.

An aspect of the present disclosure is the optical amplifier repeater system described above including a plurality of the optical amplification repeaters describe above.

Effects of the Invention

According to the present disclosure, it is possible to perform long-haul distance and high-capacity communication while reducing cost in an optical amplifier repeater system of an optical fiber communication scheme adopting mode division multiplexing.

DESCRIPTION OF EMBODIMENTS

Hereinafter, embodiments of the present disclosure will be described in detail with reference to the drawings. The embodiments described below are examples of embodiments of the present disclosure, and the present disclosure is not limited to the following embodiments. Note that in the present specification and the drawings, components having the same functions are designated by the same reference signs, and repetition of descriptions of such configurations is omitted. The embodiments can be combined with each other as far as possible. Furthermore, in the following, when the number of functional units XXX is Y, Y number of functional units XXX are described as functional units XXX-1 to XXX-Y.

The present embodiments relate to an optical amplifier repeater system (light amplifying relay system). According to the optical amplifier repeater system, in an optical transmission line provided with an optical fiber propagating a light beam in a plurality of propagation modes and an optical amplifier repeater including a simultaneous pumped optical amplifier that amplifies intensities of a plurality of single-mode light beams by one pumping light source, the intensities of the plurality of optical signals input to the simultaneous pumped optical amplifier are properly set to achieve good transmission characteristics of the plurality of optical paths uniformly. Note that the optical path is a transmission line of light from the transmission end to the reception end, or a partial section of the transmission line.

First Embodiment

Figure 1:
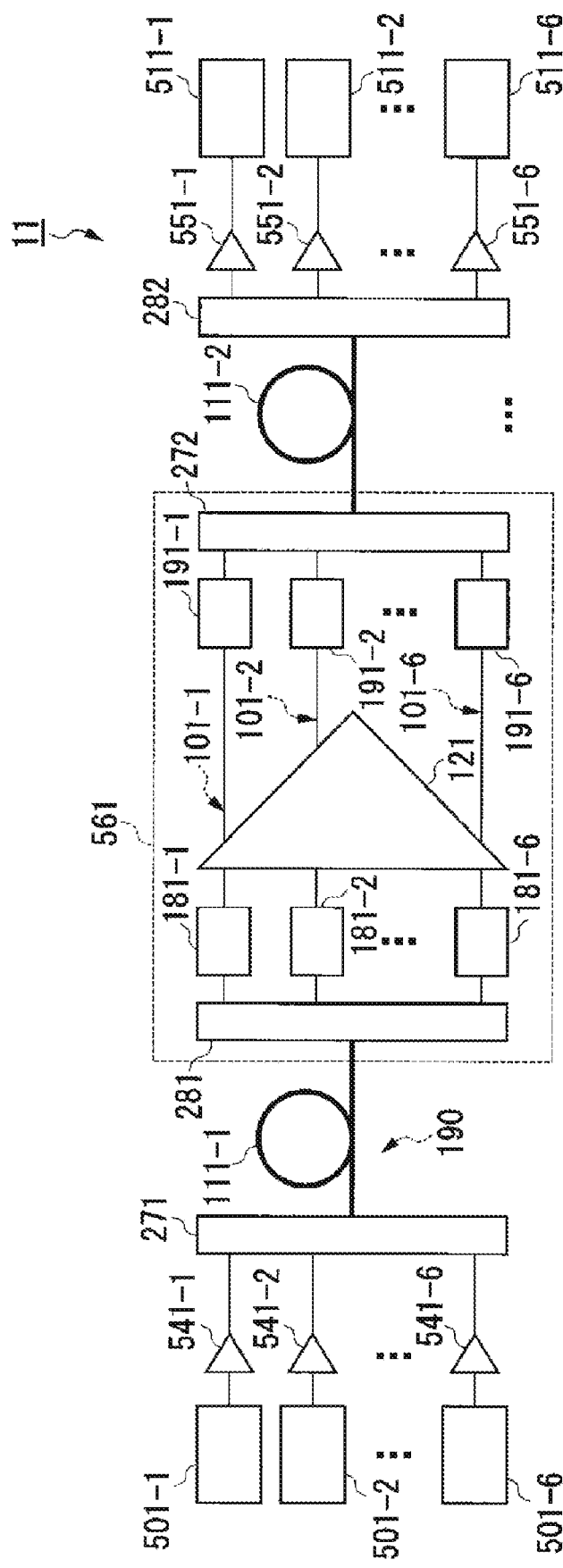
FIG. 1 is a schematic configuration diagram of an optical amplifier repeater system according to a first embodiment of the present disclosure.

FIG. 1 is a schematic configuration diagram of an optical amplifier repeater system 11 according to the present embodiment. The optical amplifier repeater system 11 includes optical transmitters 501-1 to 501-6, optical fiber amplifiers 541-1 to 541-6, a multi-mode optical multiplexer 271, an optical transmission line 190, a multi-mode optical demultiplexer 282, optical fiber amplifiers 551-1 to 551-6, and optical receivers 511-1 to 511-6. The optical transmission line 190 includes optical fibers 111-1 to 111-P (P is an integer of two or more in the figure, and P is two in the figure), and one or more optical amplifier repeaters 561. Each of the optical fibers 111-1 to 111-P is a multi-mode optical fiber for transmission for propagating propagation modes the number of which is M (M is an integer of two or more, and M is six in the present embodiment).

The optical amplifier repeater 561 includes a multi-mode optical demultiplexer 281, a simultaneous pumped multi-core optical amplifier 121, and a multi-mode optical multiplexer 272. The multi-mode optical demultiplexer 281 demultiplexes a light beam in a plurality of propagation modes propagating through the optical fiber 111-$p$ ($p$ is an integer of one or more and P−1 or less) into a plurality of single-mode light beams. The simultaneous pumped multi-core optical amplifier 121 is a simultaneous pumped multi-core optical amplifier that amplifies intensities of the plurality of single-mode light beams by one pumping light source. The multi-mode optical multiplexer 272 multiplexes the plurality of single-mode light beams into a light beam in a plurality of propagation modes and inputs the resultant to the optical fiber 111-($p$+1). The optical amplifier repeater 561 includes variable optical intensity attenuators 181-1 to 181-6 and waveform shapers 191-1 to 191-6 on optical transmission lines 101-1 to 101-6 which are optical paths of the single-mode light beams resulting from the demultiplexing by the multi-mode optical demultiplexer 281. The variable optical intensity attenuators 181-1 to 181-6 attenuate optical intensities of the optical transmission lines 101-1 to 101-6, respectively. The waveform shapers 191-1 to 191-6 set optical intensities of wavelength channels of the respective optical signals that are wavelength-division-multiplexed.

At the transmission end, an optical signal is generated by each of the optical transmitters 501-1 to 501-6. The optical fiber amplifier 541-$m$ (in the figure, m is an integer of one or more and M or less) amplifies an optical intensity of the optical signal generated by the optical transmitter 501-$m$. The multi-mode optical multiplexer 271 mode-multiplexes the optical signals amplified by the respective optical fiber amplifiers 541-1 to 541-6 with the number of mode multiplexes M being six, and inputs the resultant to the optical fiber 111-1. The mode-multiplexed optical signal is propagated through the optical fiber 111-1. The optical signal with the number of mode multiplexes M being six is transmitted using the optical fiber 111-1 as a transmission medium, and thereafter, the optical amplifier repeater 561 amplifies an optical intensity of each signal, shapes the waveform, and then, inputs the resultant to the optical fiber 111-2. The optical signal with the number of mode multiplexes M being six is propagated through the optical fiber 111-2.

After the above operation is repeated P−1 times, at the reception end, the multi-mode optical demultiplexer 282 demultiplexes the optical signal with the number of mode multiplexes M being six input from the optical fiber 111-P into six single-mode light beams. The optical fiber amplifiers 551-1 to 551-6 amplify optical signal intensities of the single-mode light beams resulting from the demultiplexing by the multi-mode optical demultiplexer 282. The optical receiver 511-$m$ receives the single-mode light beam amplified by the optical fiber amplifier 551-$m$. The optical receivers 511-1 to 511-6 demodulate the received light beams by digital signal processing to restore the original signals.

In the related art, a method has been known in which a plurality of optical signals are mode-multiplexed, transmitted to a relay point, and then, optically amplified and relayed by the optical fiber amplifiers individually for respective modes. However, the method has a problem in that a large number of optical fiber amplifiers are required. Furthermore, a method has been known in which a plurality of optical signals are mode-multiplexed, transmitted to a relay point, and then, optically amplified and relayed by the multi-mode optical fiber amplifier. However, the inter-mode loss difference and gain difference cause the signal quality to be rate-limited to the lowest characteristic mode, and thus, good transmission is difficult. In contrast, the optical amplifier repeater system 11 according to the present embodiment uses the optical amplifier repeater 561 as the optical repeater, the optical fiber 111 that is a multi-mode optical fiber as the optical transmission line, and the simultaneous pumped multi-core optical amplifier 121 as an optical repeater. This enables an optical amplifier repeater system to have a small characteristic variation between spatial channels while achieving reduction in the number of devices and power consumption. Furthermore, by using optical intensity adjusting means of the variable optical intensity attenuators 181-1 to 181-6 and the waveform shapers 191-1 to 191-6 in the optical amplifier repeater 561, the characteristic variation between a plurality of optical signals is finely adjusted, and variations in the simultaneous pumped multi-core optical amplifier 121 and the optical fiber 111 are minimized. Note that the waveform shapers 191-1 to 191-6 are optionally implemented. The waveform shapers 191-1 to 191-6 may also adjust, in addition to the optical intensity of each wavelength channel, the optical intensity of the spatial channel together, and may be used in place of the variable optical intensity attenuator 181.

In the present embodiment, a 4LP mode (6 modes) optical fiber including a core for propagating six modes LP01, LP11a, LP11b, LP21a, LP21b, LP02 is used as the optical fibers 111-1 to 111-P. However, the present embodiment can be applied to optical fiber transmission lines for propagating any type of mode and number of modes. As the multi-mode optical demultiplexer 281, a mode demultiplexer is used that mode-demultiplexes the mode-multiplexed light beam in which six propagation modes are multiplexed into six single-mode light beams for the respective modes. Additionally, as the multi-mode optical multiplexer 272, a mode multiplexer is used that multiplexes six single-mode light beams into a mode-multiplexed light beam in which six propagation modes are multiplexed. As the simultaneous pumped multi-core optical amplifier 121, an N-channel (N is an integer of two or more and N is equal to or more than M) cladding-pumped multi-core optical amplifier (reference documents 1 and 2 below) is used.

(Reference document 1) H. Ono et al., "12-Core Double-Clad Er/Yb-Doped Fiber Amplifier Employing Free-space Coupling Pump/Signal Combiner Module," ECOC2013, We. 4. A. 4, 2013

(Reference document 2) S. Takasaka et al., "Cladding-Pumped Seven-Core EDFA Using a Multimode Pump Light Coupler," ECOC2013, We. 4. A. 5, 2013.

Figure 2:
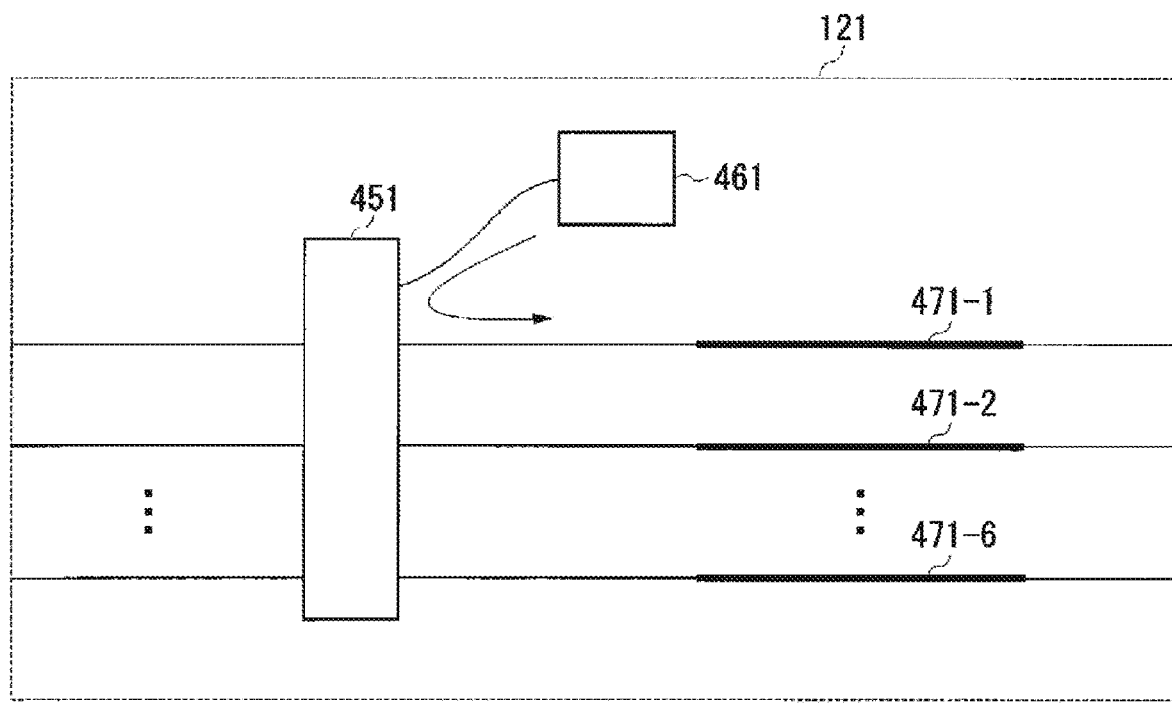
FIG. 2 is a diagram illustrating a configuration example of a simultaneous pumped multi-core optical amplifier according to the embodiment.

FIG. 2 is a diagram illustrating a configuration example of the simultaneous pumped multi-core optical amplifier 121. The simultaneous pumped multi-core optical amplifier 121 has seven input/output ports, six ports of which are connected to the six single-mode optical transmission lines 101-1 to 101-6. The simultaneous pumped multi-core optical amplifier 121 includes a fan-in (FI) device (not illustrated), at an input end, that is connected to a multi-core optical fiber having seven cores in which seven single-mode fibers are bundled, a seven-core erbium-doped multi-core optical fiber including six optical amplification media 471-1 to 471-6, and a fan out (FO) device (not illustrated), at an output end, that demultiplexes the light beam of the multi-core optical fiber having seven cores into light beams of seven single-mode fibers. The simultaneous pumped multi-core optical amplifier 121 also includes a pumping light source 461 and an optical coupler 451. The optical coupler 451 optically couples a pumping light beam generated by the pumping light source 461 to a cladding of the erbium-doped multi-core optical fiber.

As an example, a multi-mode laser diode is used as the pumping light source 461, and an erbium-doped optical fiber is used as the optical amplification media 471 to 471-6. In this configuration, one pumping light source 461 can simultaneously amplify the optical intensities of seven cores. Note that, depending on the required power, two pumping light sources may be used. A plurality of pumping light sources having the same wavelength or different wavelengths may be used. In the optical amplifier repeater system 11 according to the present embodiment, the number of the optical transmission lines 101-1 to 101-6 is six, whereas the simultaneous pumped multi-core optical amplifier 121 has seven input/output ports. As such, among the ports of the simultaneous pumped multi-core optical amplifier 121, the ports through which peripheral six cores pass are used to avoid using a channel passing through the center core where an inter-core cross talk is higher than that of the peripheral cores. This results in good characteristics without interference from the adjacent core. Of course, any port may be used.

During propagation through the optical fiber 111, an inter-mode loss difference is generated in the multi-mode optical multiplexer 271, the multi-mode optical demultiplexer 281, and connection points between these optical devices. This causes optical intensity differences between six optical signals input from the respective optical transmission lines 101-1 to 101-6 to the simultaneous pumped multi-core optical amplifier 121. Then, the optical intensity differences between the six channels are accommodated to each other using the variable optical intensity attenuators 181-1 to 181-6. There may be provided means for detecting the optical intensity before or after the variable optical intensity attenuators 181-1 to 181-6 to accommodate the optical intensity differences. For example, a dedicated detection device for detecting an optical intensity may be provided, or an optical monitor may be used being included in other devices such as a multi-core EDFA used as the simultaneous pumped multi-core optical amplifier 121.

Figure 3:
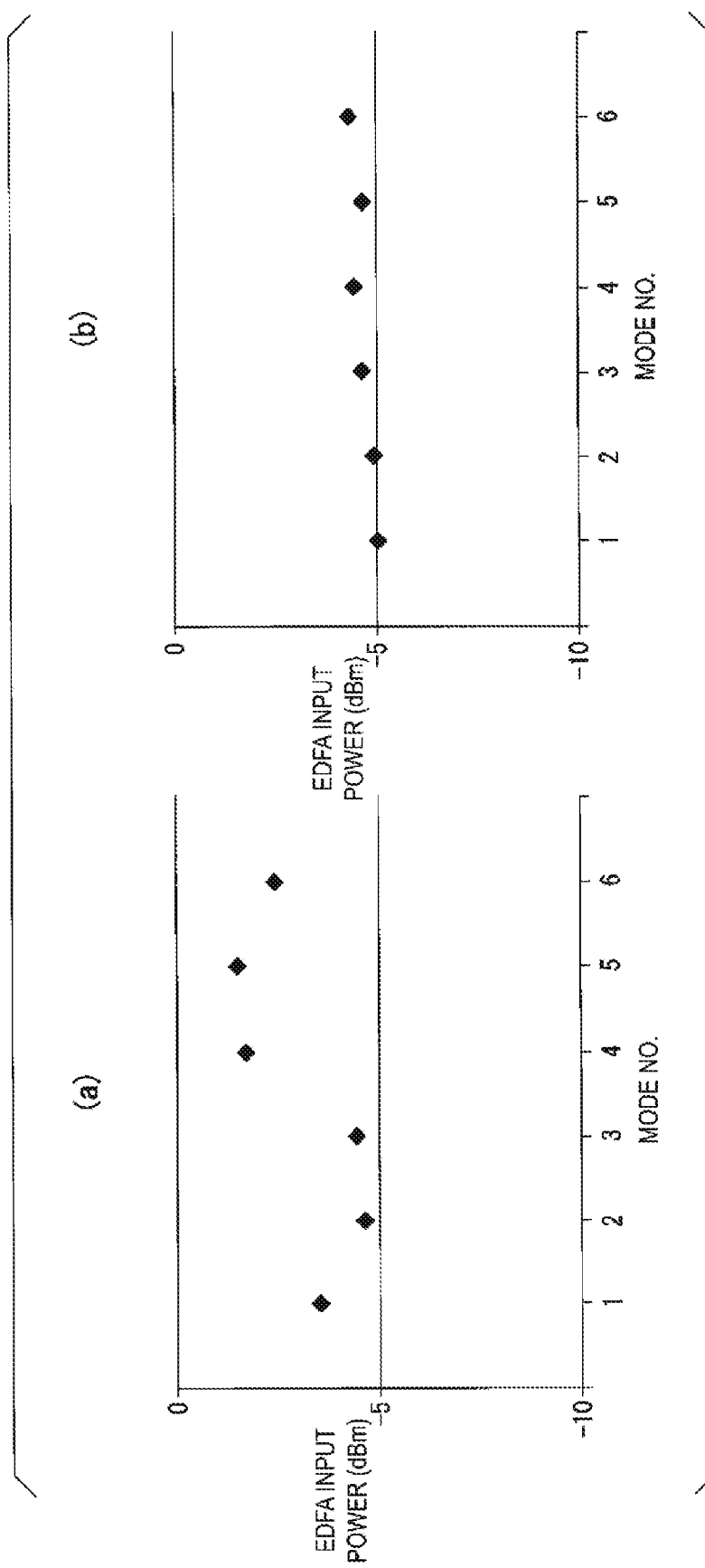
FIG. 3 is a diagram illustrating an input power in each mode to the simultaneous pumped optical amplifier before and after applying the embodiment.

FIG. 3 is a diagram illustrating an input power in each mode to the simultaneous pumped optical amplifier before and after applying the present embodiment. FIG. 3(a) illustrates the input powers from the six optical transmission lines to the simultaneous pumped optical amplifier before applying the present embodiment. In a process in which an optical transmission signal is propagated through the multi-mode optical multiplexer 271, the optical fiber 111-1, and the multi-mode optical demultiplexer 281, a power deviation of approximately 3 dB is generated between the six modes (optical transmission lines 101-1 to 101-6). If the optical signals of the plurality of optical paths are amplified by the simultaneous pumped multi-core optical amplifier 121, the variation in the power between the spatial channels further increases. In the present embodiment, the variation is reduced using the variable optical intensity attenuators 181. FIG. 3(b) illustrates the powers input from the optical transmission lines 101-1 to 101-6 to the simultaneous pumped multi-core optical amplifier 121. As illustrated in FIG. 3(b), by setting each of the powers input to the simultaneous pumped multi-core optical amplifier 121 to an appropriate level, a uniform optical power is obtained after the amplification. Accordingly, the simultaneous pumped multi-core optical amplifier, which has been conventionally used only in the multi-core transmission line, can also be applied to the multi-mode transmission line.

The simultaneous pumped multi-core optical amplifier 121 such as a simultaneous pumped multi-core EDFA, which cannot adjust the variation in the power between the cores, has not been used in a medium in which the variation between the channels is generated due to the inter-mode loss difference such as in the mode-multiplexing transmission. In the present embodiment, the variable optical intensity attenuators 181-1 to 181-6 and the waveform shapers 191-1 to 191-6 adjust the variation in the characteristics between the plurality of optical signals to allow the simultaneous pumped multi-core optical amplifier 121 to be applied to the mode-multiplexing transmission.

Second Embodiment

Figure 4:
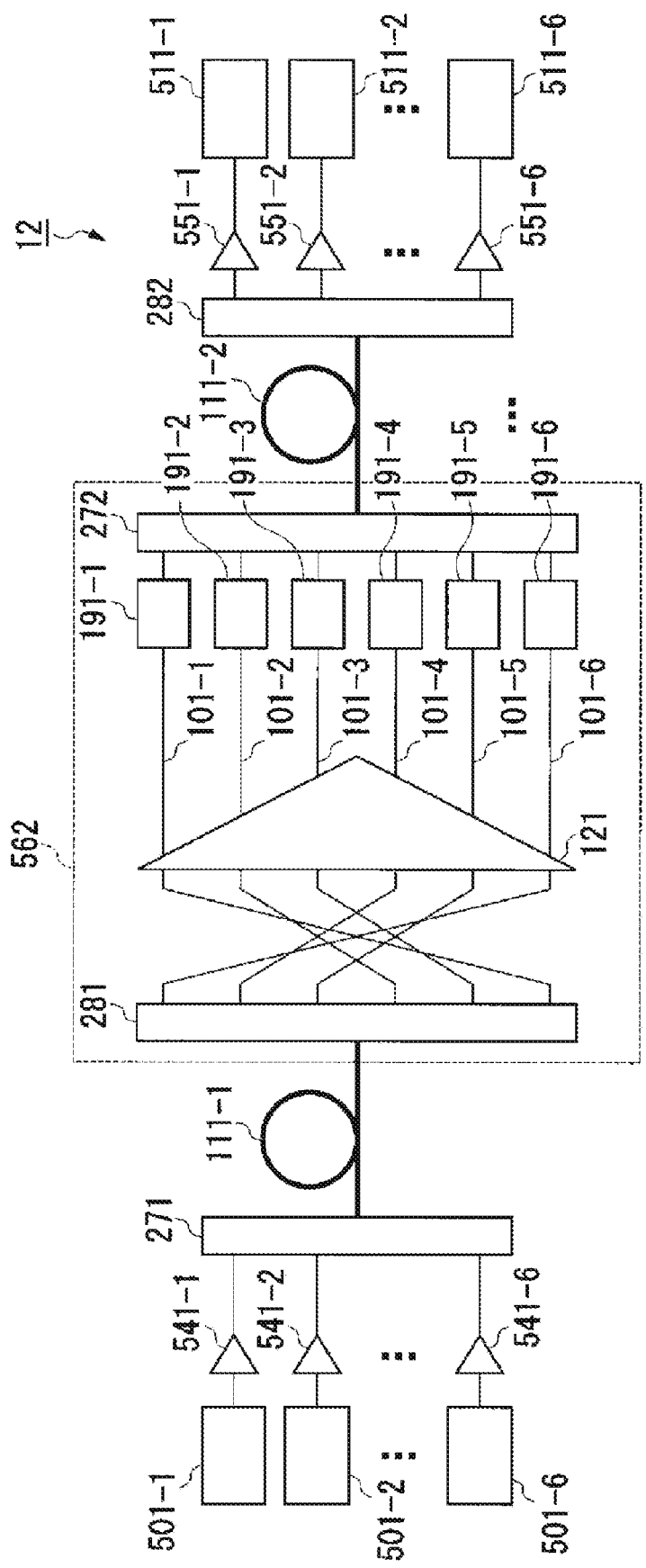
FIG. 4 is a schematic configuration diagram of an optical amplifier repeater system according to a second embodiment.

FIG. 4 is a schematic configuration diagram of an optical amplifier repeater system 12 according to the present embodiment. In the figure, the same components as those of the optical amplifier repeater system 11 according to the first embodiment illustrated in FIG. 1 are denoted by the same reference signs and descriptions thereof are omitted. The optical amplifier repeater system 12 according to the present embodiment differs from the optical amplifier repeater system 11 according to the first embodiment illustrated in FIG. 1 in that the optical amplifier repeater system 12 includes an optical amplifier repeater 562 in place of the optical amplifier repeater 561. The optical amplifier repeater 562 includes the multi-mode optical demultiplexer 281, the simultaneous pumped multi-core optical amplifier 121, the waveform shapers 191-1 to 191-6, and the multi-mode optical multiplexer 272. The waveform shapers 191-1 to 191-6 are provided on the optical transmission lines 101-1 to 101-6 between the simultaneous pumped multi-core optical amplifier 121 and the multi-mode optical multiplexer 272.

The optical amplifier repeater system 12 according to the present embodiment differs from the optical amplifier repeater system 11 according to the first embodiment in a connection section between the multi-mode optical demultiplexer 281 and the simultaneous pumped multi-core optical amplifier 121. As described in the first embodiment, a difference is generally generated between the optical intensities of the signal light beams propagated through the optical transmission lines 101-1 to 101-6. Moreover, a difference in the pumping characteristics of the simultaneous pumped multi-core optical amplifier 121 is generated between the channels. Therefore, in the present embodiment, combinations of output ports of the multi-mode optical demultiplexer 281 and input ports of the simultaneous pumped multi-core optical amplifier 121 are taken into consideration for the connection to minimize the variation in the optical intensity of the signal light between the optical transmission lines after being optically amplified and relayed. As a result, at an input section of the simultaneous pumped multi-core optical amplifier 121, the optical intensities of six optical transmission lines 101-1 to 101-6 are made substantially uniform, and there is no need to use the variable optical intensity attenuators 181-1 to 181-6 unlike in the first embodiment. In this way, the optical amplifier repeater system 12 according to the present embodiment achieves a low-loss optical amplifier repeater system that is simpler and lower in cost.

Figure 5:
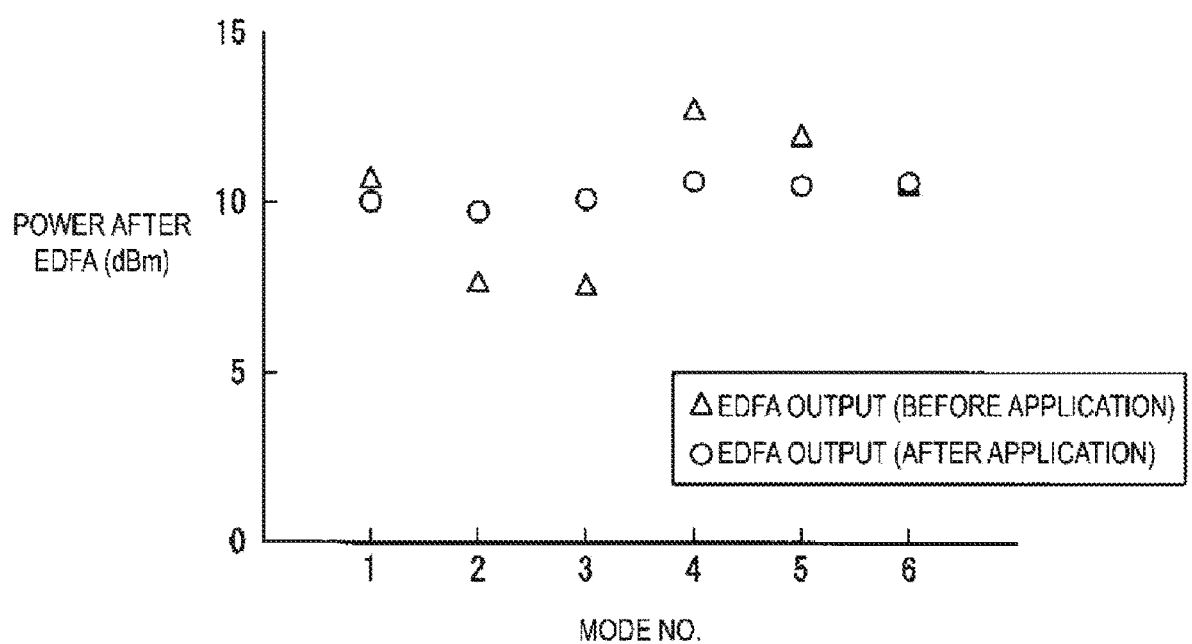
FIG. 5 is a diagram illustrating an optical power after an EDFA before and after applying the embodiment.

FIG. 5 is a diagram illustrating an optical power after amplification before and after applying the present embodiment. In the figure, a simultaneous pumped multi-core EDFA is used as the simultaneous pumped multi-core optical amplifier 121. As illustrated in the figure, the variation in the optical intensity between the modes after the EDFA is improved after applying the present embodiment as compared to before applying.

Note that in the present embodiment, the output ports of the multi-mode optical demultiplexer 281 and the input ports of the simultaneous pumped multi-core optical amplifier 121 are fixedly connected to each other, but the connection between the ports may be switched in accordance with the input signal. Moreover, the points for mutual connection may be given points and may be applied after the optical amplifier.

Third Embodiment

Figure 6:
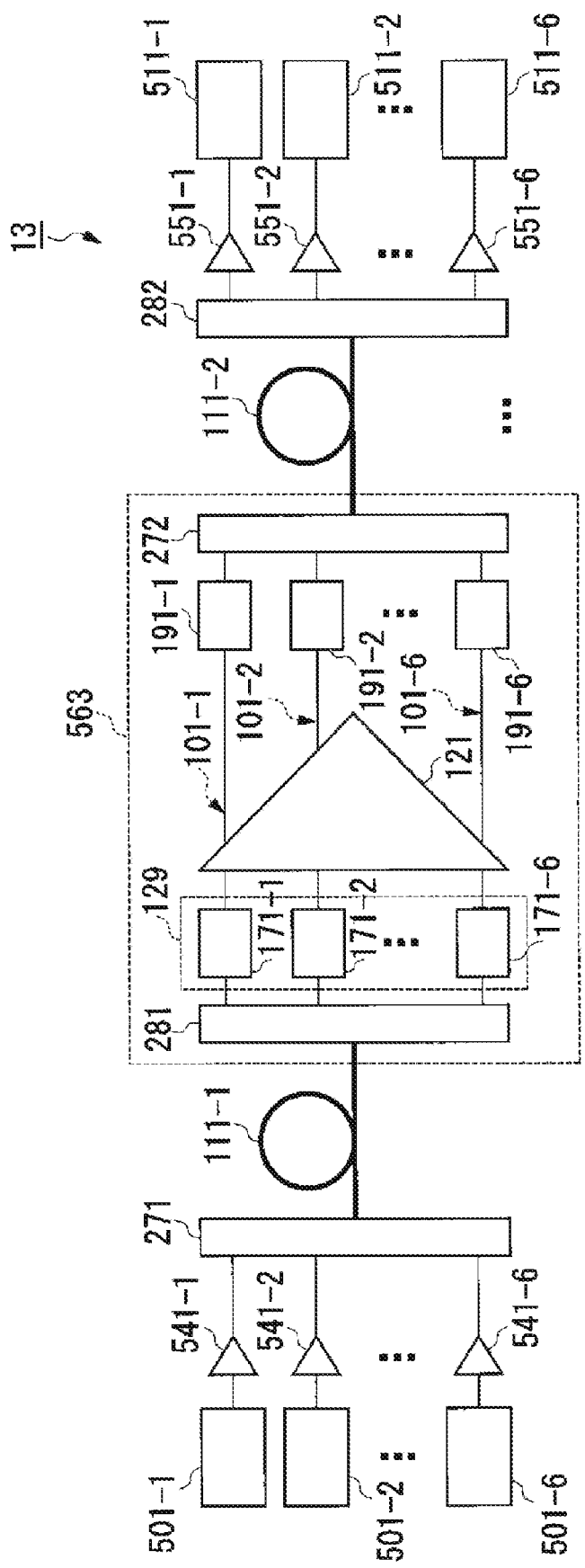
FIG. 6 is a schematic configuration diagram of an optical amplifier repeater system according to a third embodiment.

FIG. 6 is a configuration diagram of an optical amplifier repeater system 13 according to the present embodiment. In the figure, the same components as those of the optical amplifier repeater system 11 according to the first embodiment illustrated in FIG. 1 are denoted by the same reference signs and descriptions thereof are omitted. The optical amplifier repeater system 13 according to the present embodiment differs from the optical amplifier repeater system 11 according to the first embodiment illustrated in FIG. 1 in that the optical amplifier repeater system 13 includes an optical amplifier repeater 563 in place of the optical amplifier repeater 561. The optical amplifier repeater 563 differs from the optical amplifier repeater 561 according to the first embodiment in that a multi-channel optical amplifier is used in place of the variable optical intensity attenuators 181-1 to 181-6 as the optical intensity adjusting means to set the optical intensities of a plurality of optical paths by amplifying the optical intensities. The multi-channel optical amplifier includes an optical amplifier capable of performing amplification with an amplification amount different for each core and an optical amplifier provided with a plurality of single-mode optical amplifiers for each core.

As an example of the multi-channel optical amplifier, an individual pumped (core-pumped) multi-core optical amplifier 129 is used. More specifically, in the optical amplifier repeater system 13, the number of modes M propagated through the optical fibers 111-1 to 111-P is six, a cladding-pumped multi-core optical amplifier with N being seven channels is used as the simultaneous pumped multi-core optical amplifier 121, and the individual pumped multi-core optical amplifier 129 is used as the optical intensity adjustment means. The individual pumped multi-core optical amplifier 129 adjusts the amplification amount of each of the light beams transmitted through the optical transmission lines 101-1 to 101-6 by optical amplifiers 171-1 to 171-6.

The simultaneous pumped multi-core optical amplifier 121 is excellent in power saving properties, but is incapable of adjustment for each core because the optical intensities within a plurality of cores are uniformly amplified. Thus, in the first embodiment, the intensity difference between the cores is made uniform by attenuating the optical intensities. In contrast, in the present embodiment, the individual pumped multi-core optical amplifier 129 is used together to adjust the optical intensity for each core. By using both components in combination, both advantages of the power saving properties and the control properties can be obtained.

The optical amplifier repeater system 13 according to the present embodiment can amplify the optical intensities larger than those according to the first and second embodiments, by use of the individual pumped multi-core optical amplifier 129 in combination. The order of the individual pumped multi-core optical amplifier 129 and the simultaneous pumped multi-core optical amplifier 121 is optional. Furthermore, in general, as the number of channels of the optical signals is larger and a relay interval is wider, a larger output power is required, and thus, a plurality of individual pumped multi-core optical amplifiers 129 and simultaneous pumped multi-core optical amplifiers 121 may be connected in a multistage manner and used. In addition, in the first embodiment, the optical intensities are attenuated by the variable optical intensity attenuators 181-1 to 181-6 to discard the energy of the light beams, whereas in the present embodiment, the ports with low optical intensity are pumped. As a result, the optical amplifier repeater system 13 according to the present embodiment can achieve the system with less waste and more energy-saving properties.

Fourth Embodiment

Figure 7:
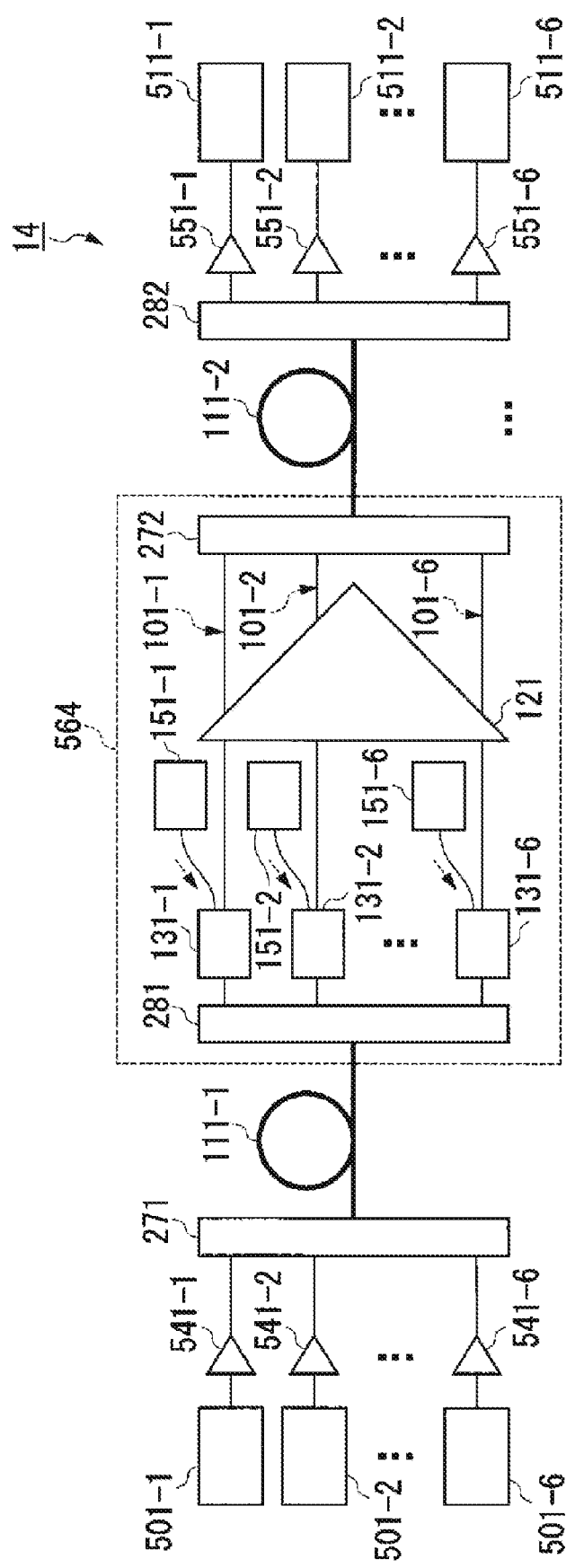
FIG. 7 is a schematic configuration diagram of an optical amplifier repeater system according to a fourth embodiment.

FIG. 7 is a configuration diagram of an optical amplifier repeater system 14 according to the present embodiment. In the figure, the same components as those of the optical amplifier repeater system 11 according to the first embodiment illustrated in FIG. 1 are denoted by the same reference signs and descriptions thereof are omitted. The optical amplifier repeater system 14 according to the present embodiment differs from the optical amplifier repeater system 11 according to the first embodiment illustrated in FIG. 1 in that the optical amplifier repeater system 14 includes an optical amplifier repeater 564 in place of the optical amplifier repeater 561. The optical amplifier repeater 564 according to the present embodiment differs from the optical amplifier repeater 561 according to the first embodiment in that distributed Raman amplification is used as the optical intensity adjusting means to set (adjust) the optical intensities of the plurality of optical transmission lines 101-1 to 101-6 by amplifying the optical intensities. The optical amplifier repeater 564 includes the multi-mode optical demultiplexer 281, wavelength multiplexers 131-1 to 131-6, pumping light sources 151-1 to 151-6, the simultaneous pumped multi-core optical amplifier 121, and the multi-mode optical multiplexer 272.

More specifically, in the optical amplifier repeater system 14, the number of modes M propagated through the optical fibers 111-1 to 111-P (P is two in the figure) is six, and the multi-mode optical demultiplexer 281 multiplexes and demultiplexes light in M propagation modes (M is six) into N single-mode light beams (N is six). In the optical amplifier repeater 564, on N optical transmission lines 101-$n$ (N is six and n is an integer of one or more and N or less), the wavelength multiplexers 131-n multiplexing light beams having wavelengths different from optical signal bands are provided, and the pumping light sources 151-n outputting pumping light beams having the wavelengths different from the optical signal bands Raman-amplify the optical intensities of the optical signal bands. The amplification amount by the Raman amplification is set in accordance with the characteristic difference in the optical signals passing through the optical transmission lines 101-1 to 101-6 of the N single-mode light beams (N is six). The respective wavelength multiplexers 131-1 to 131-6 multiplex the pumping light beams, so that the simultaneous pumped multi-core optical amplifier 121 simultaneously amplifies the optical signals Raman-amplified.

Similar to the third embodiment, in the present embodiment, the optical intensities can be amplified larger than in the first and second embodiments, by use of the core-pumped simultaneous pumped multi-core optical amplifier 121, and the wavelength multiplexers 131-1 to 131-6 and the pumping light sources 151-1 to 151-6 in combination.

In addition, in the first embodiment, the optical intensities are attenuated by the variable optical intensity attenuators 181-1 to 181-6 to discard the energy of the light beams, whereas in the present embodiment, the ports with low optical intensity are pumped, achieving the system with less waste and more energy-saving properties. Furthermore, by using the distributed Raman amplification, an optical signal noise ratio (OSNR) of the core with high loss is compensated for, obtaining better transmission characteristics.

Figure 8:
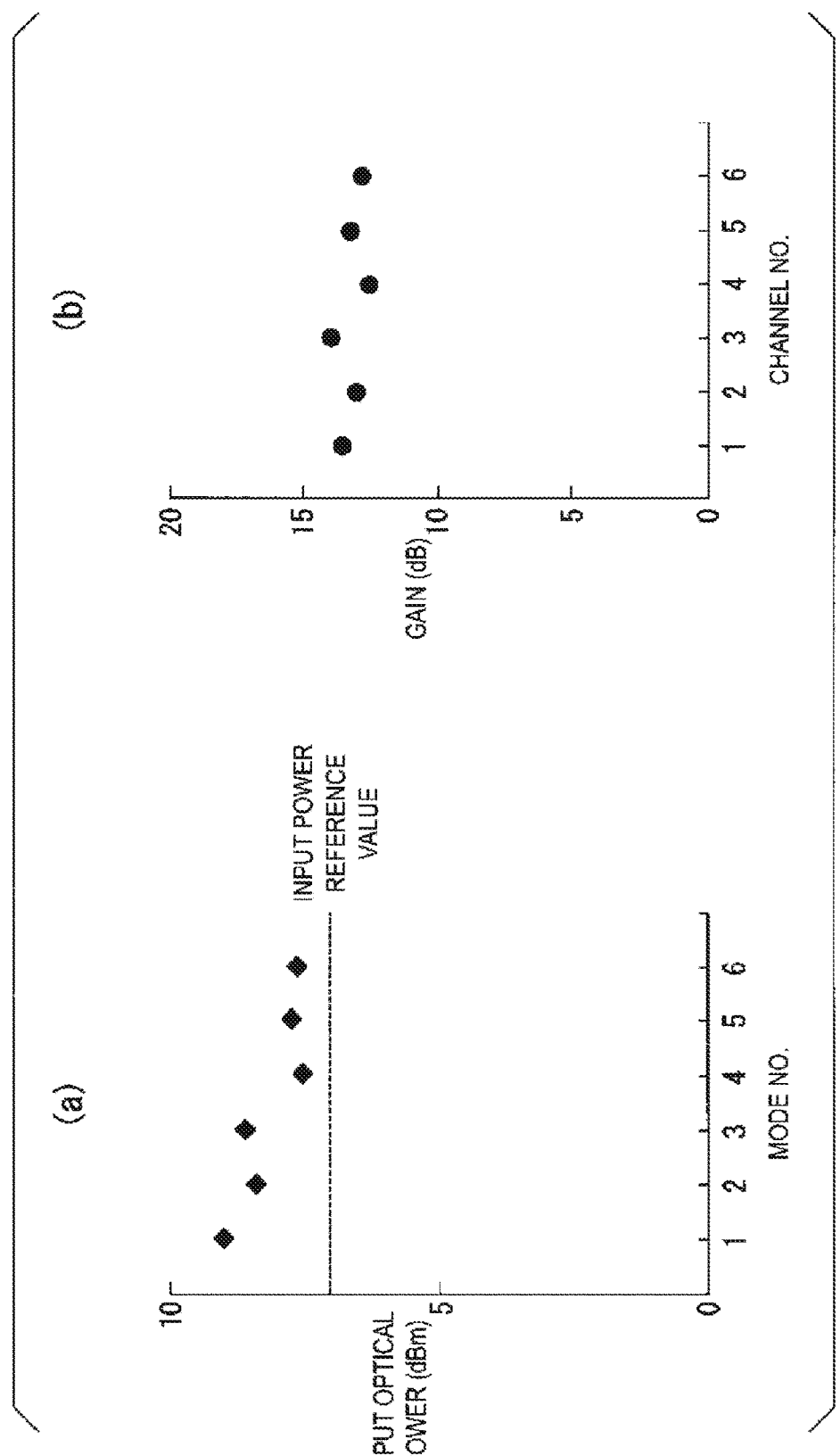
FIG. 8 is a diagram illustrating an input power to a transmission line and characteristics of a gain of a simultaneous pumped optical amplifier in the optical amplifier repeater system according to the embodiment.
Figure 9:
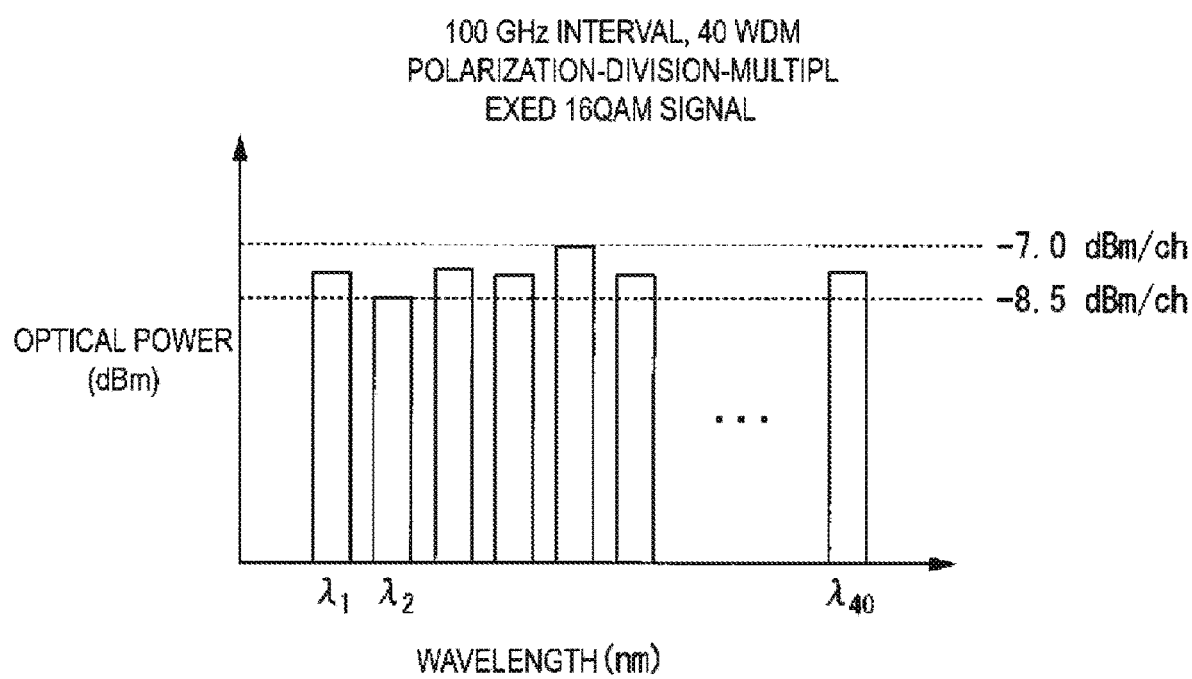
FIG. 9 is a diagram illustrating an example of an optical signal according to the embodiment.

FIG. 8 is a diagram illustrating characteristics of an input power to the transmission line and a gain of the simultaneous pumped optical amplifier in the optical amplifier repeater system 14 according to the present embodiment. FIG. 8(a) is a diagram illustrating an example of an optical power of an input signal to each of the optical transmission lines 101-1 to 101-6 in the optical amplifier repeater system 14. The mode number n (n is an integer of one or more and six or less) corresponds to the optical transmission line 101-n. As illustrated in FIG. 9, the input signal in each mode, in which 40 wavelengths $\lambda_1$ to $\lambda_{40}$ are wavelength-division-multiplexed (WDM) at 100 GHz intervals to obtain WDM light, and the respective wavelengths $\lambda_1$ to $\lambda_{40}$ are polarization-division-multiplexed and modulated by 16QAM (Quadrature Amplitude Modulation) scheme, is made into a 40-WDM polarization-division-multiplexed 16QAM signal. FIG. 9 illustrates the wavelength-division-multiplexed signal of the mode number 2 as an example. The input power varies between the modes from 7.5 to 9.0 dBm (−8.5 to −7.0 dBm/ch per wavelength) and averages 8.25 dBm (−7.75 dBm/ch per wavelength).

FIG. 8(b) is a diagram illustrating gain characteristics of the simultaneous pumped multi-core optical amplifier 121 used in the optical amplifier repeater system 14. The 40-WDM polarization-division-multiplexed 16QAM signal set to optical power of −5 dBm is input to each port of the simultaneous pumped multi-core optical amplifier 121, the optical power after amplification is measured, and a difference in the optical power before and after the amplification is taken as the gain. The channel number n (n is an integer of one or more and six or less) corresponds to the nth port into which a light beam of the mode number n is inserted. The gain varies between the ports from 12.5 to 14 dB and an average value is about 13 dB.

In this way, the optical powers are non-uniform between the plurality of optical transmission lines even at the input point, and the gain difference between the ports of the simultaneous pumped multi-core optical amplifier 121 causes increasing in the characteristic variation between the optical transmission lines. Additionally, the input signal also passes through optical fibers, optical connectors, light branches, and the like, with different loss characteristics on each optical transmission line. For this reason, the characteristic variations of these optical transmission medium and optical components cause the characteristic deviation to increase further.

Figure 10:
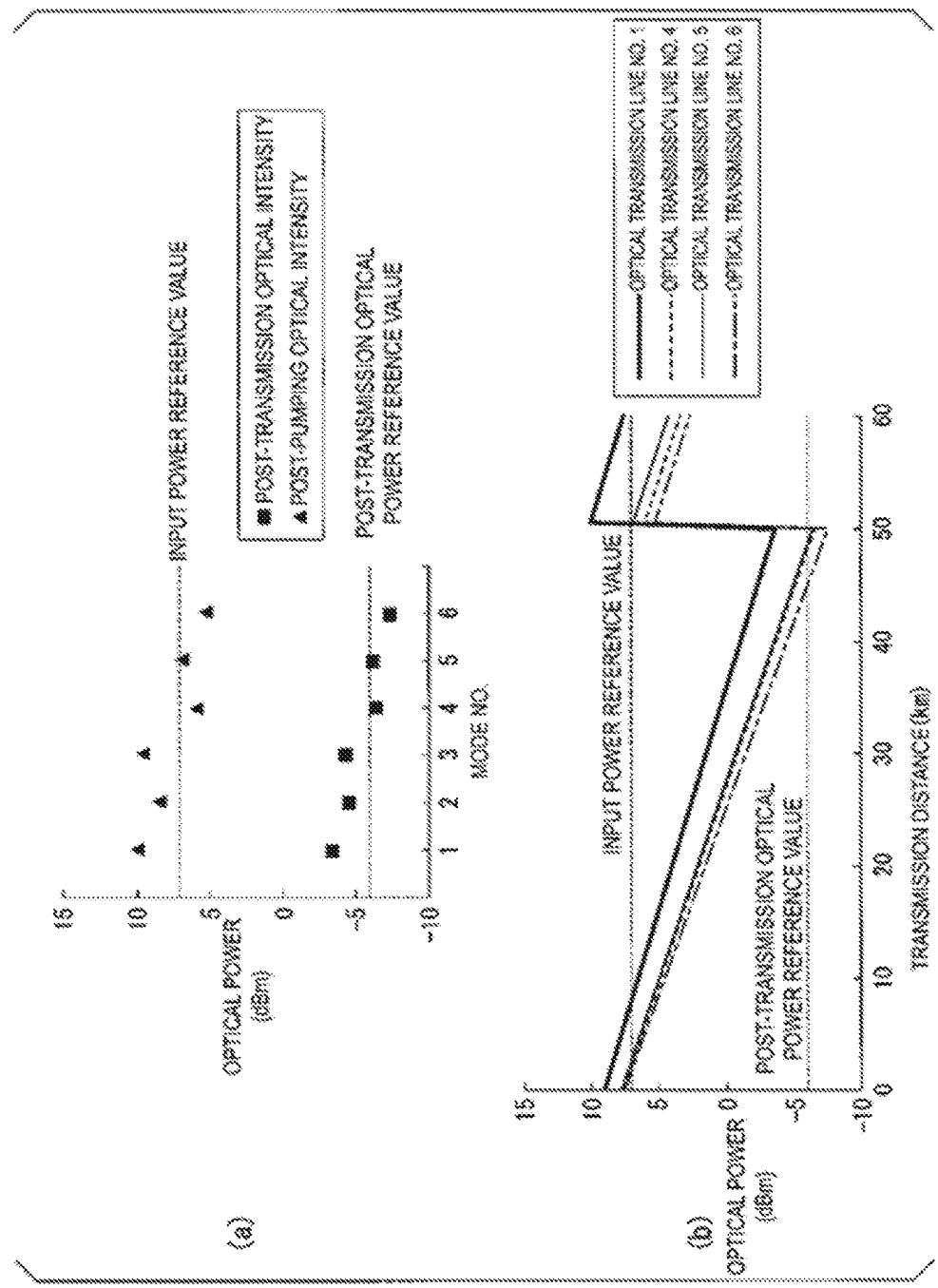
FIG. 10 is a diagram illustrating an optical power of an optical signal before applying Raman amplification according to the embodiment.

FIG. 10 is a diagram illustrating an optical power of an optical signal before applying the Raman amplification according to the present embodiment. FIG. 10(a) illustrates an optical intensity after transmitting an optical signal through the optical fiber 111 for 50 km and an optical intensity after being amplified by the simultaneous pumped multi-core optical amplifier 121 used in the present embodiment. After transmitting the optical signal, it is necessary to keep the optical power of the optical signal at or above a predetermined level with respect to the noise level to keep signal quality. The required optical signal noise ratio (OSNR) varies depending on the modulation scheme, and generally the higher OSNR tends to be required for signals with higher speed and higher multilevel degree.

FIG. 10(a) further illustrates the minimum power required for transmission and reception of the WDM optical signal used in the present embodiment as a post-transmission optical power reference value. A case of falling below the reference value after transmitting the optical signal indicates that a predetermined signal quality cannot be maintained. To exceed the optical power reference value even after the transmission, the input power is set based on an average propagation loss of the optical fiber, and a level thereof is indicated as an input power reference value. On the other hand, if the input power to the optical fiber is too high, the signal quality deteriorates due to a non-linear phenomenon. For this reason, it is necessary to set the input power to the optical fiber to a value that at minimum exceeds the input power reference value described above and that is not too high.

As a result of measuring the transmission characteristics, in the present embodiment, the post-transmission optical power reference value is set to −6 dBm and the input power reference value is set to 7 dBm.

FIG. 10(a) illustrates the optical intensity after the WDM signal of the optical power illustrated in FIG. 8(a) is input to the optical fiber 111 and transmitted through the optical fiber 111. The optical power of each mode varies due to the input power, the MDL, the deviation of the fusing loss, and the like. Furthermore, the optical signals in the modes 4, 5, and 6 fall below the post-transmission optical power reference value after 50 km transmission. The optical powers fall below the post-transmission optical power reference value, and thus the signal qualities are degraded compared to the optical signals passing through other transmission lines. FIG. 10(b) is a level diagram illustrating how the optical power changes with respect to these transmission distances. The optical transmission line number n corresponds to the optical transmission line of the mode number n.

In the present embodiment, the optical intensities of the optical signal bands are Raman-amplified, and a Raman amplification amount is set in accordance with the characteristic difference of each optical transmission line. The wavelength multiplexers 131-1 to 131-6, which are Raman WDM couplers, are configured to combine a pumping light source in a 1.4 μm band into a signal band of 1.5 to 1.6 μm. To compensate for the losses in the modes 4 to 6, pumping light beams of pumping wavelengths 1425 nm and 1450 nm from the pumping light sources 151-4 to 151-6 are input by the Raman WDM coupler wavelength multiplexers 131-4 to 131-6 to cause backward Raman scattering to be generated in the optical fibers constituting the optical transmission lines 101-4 to 101-6.

Figure 11:
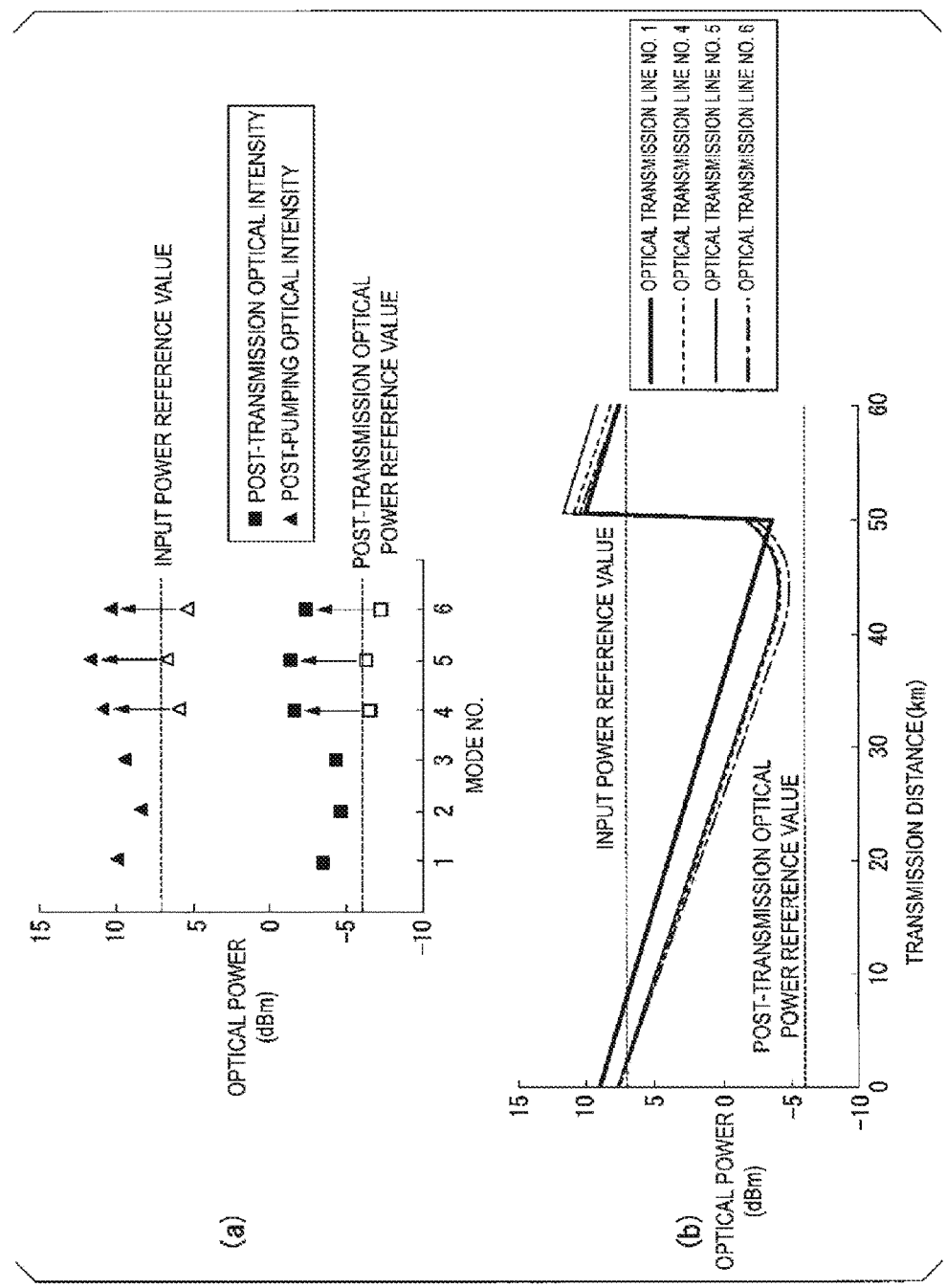
FIG. 11 is a diagram illustrating an optical power of an optical signal after applying the Raman amplification according to the embodiment.

FIG. 11 is a diagram illustrating an optical power of an optical signal after applying the Raman amplification according to the present embodiment. FIG. 11(a) is a diagram illustrating the optical powers of the optical transmission lines 101-1 to 101-6 after applying Raman pumping to the optical transmission line 101-4 with an optical transmission line number 4 (optical path in the mode 4), the optical transmission line 101-5 with an optical transmission line number 5 (optical path in the mode 5), and the optical transmission line 101-6 with an optical transmission line number 6 (optical path in the mode 6). FIG. 11(b) is a level diagram illustrating how the optical powers of the optical transmission lines 101-1 and 101-4 to 101-6 change with respect to transmission distances. As illustrated in FIG. 11(b), the optical powers are increased due to the Raman scattering effect as the signals come closer to the outputs of the optical fibers, and the powers of the optical signals are transmitted for 50 km without falling below the post-transmission optical power reference value, although, in FIG. 10(b), the optical signals of the optical transmission lines 101-4 to 101-6 fall below the post-transmission optical power reference value.

In this manner, by applying the present embodiment, the characteristic deviation between optical transmission lines is eliminated, which cannot be achieved by the conventional optical amplifier repeater system using only the optical fiber amplifiers, to achieve a high-capacity optical amplifier repeater system having good transmission quality.

The number of the optical transmission lines, the length of the transmission line, the types of the optical fibers, the optical power setting, the modulation scheme of the optical signal, the wavelength arrangement, the optical power, and the like, described above, are examples, and any kinds thereof can be used. In addition, although the cladding-pumped simultaneous pumped optical fiber amplifier is used as the simultaneous pumped multi-core optical amplifier 121, the effect according to the present embodiment can similarly be obtained even using any simultaneous pumped optical amplifier capable of pumping a plurality of optical amplification media with one pumping light source. Furthermore, although the backward Raman amplification is used in the present embodiment, the forward Raman amplification may be used, or both the forward and backward Raman amplifications may be used.

Fifth Embodiment

Figure 12:
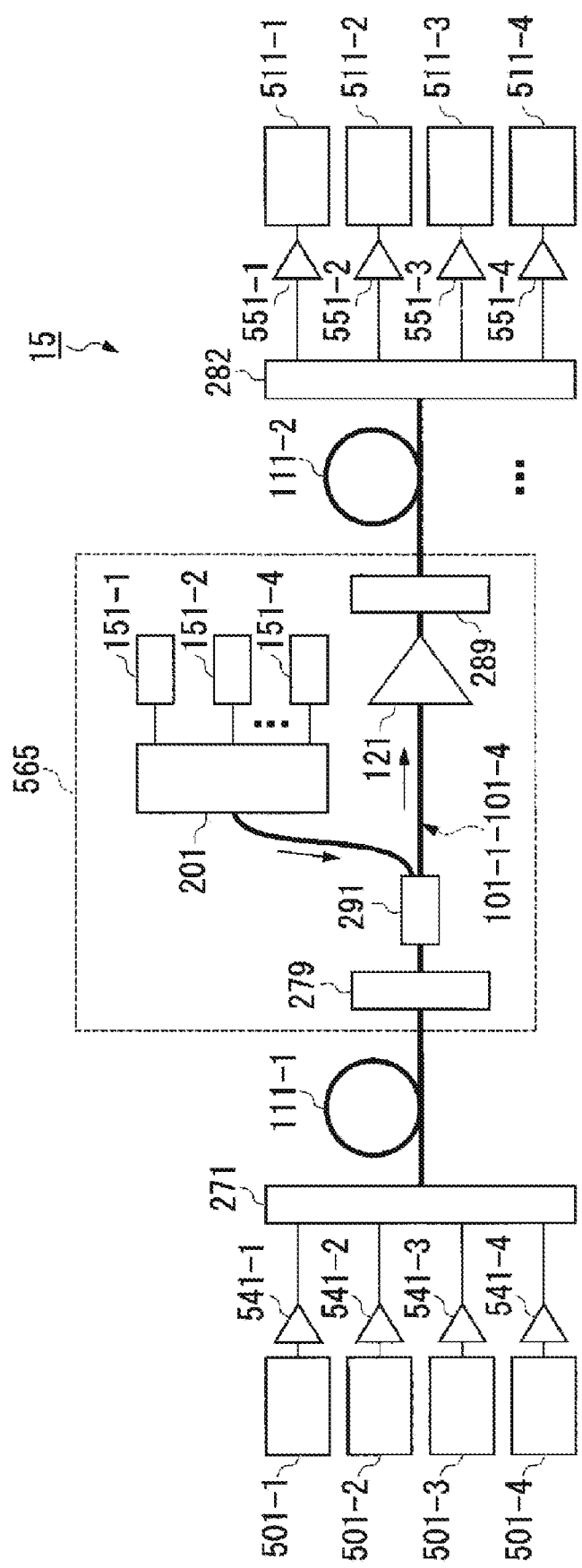
FIG. 12 is a schematic configuration diagram of an optical amplifier repeater system according to a fifth embodiment.

FIG. 12 is a schematic configuration diagram of an optical amplifier repeater system 15 according to the present embodiment. In the figure, the same components as those of the optical amplifier repeater system 11 according to the first embodiment illustrated in FIG. 1 are denoted by the same reference signs and descriptions thereof are omitted. The optical amplifier repeater system 15 according to the present embodiment differs from the optical amplifier repeater system 11 according to the first embodiment illustrated in FIG. 1 in that the optical amplifier repeater system 15 includes an optical amplifier repeater 565 in place of the optical amplifier repeater 561. Both the numbers of optical transmitters 501 and optical receivers 551 are four. The optical amplifier repeater 565 integrates distributed Raman amplification and performs multi-core distributed Raman amplification. The optical amplifier repeater 565 includes a multi-mode multi-core converter 279, the pumping light sources 151-1 to 151-4, a fan-in (FI) device 201, a multi-core WDM coupler 291, the simultaneous pumped multi-core optical amplifier 121, and a multi-core multi-mode converter 289.

Figure 13:
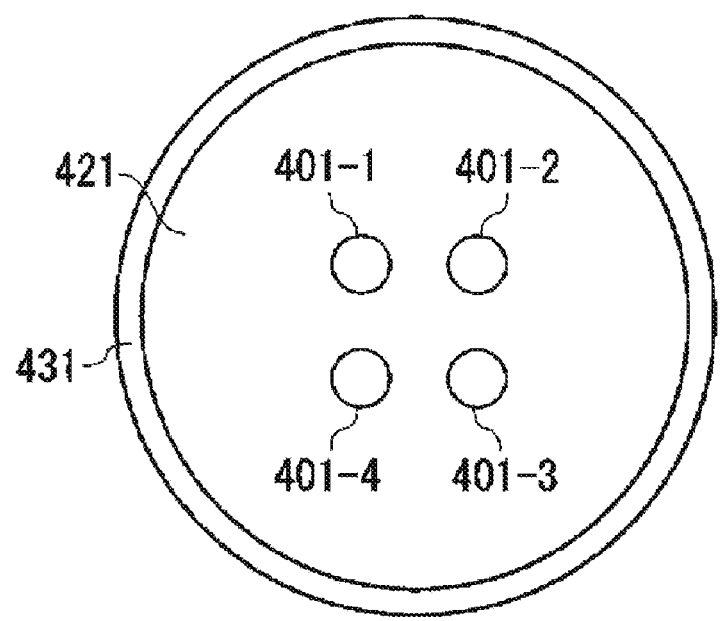
FIG. 13 is a diagram illustrating a cross section of a multi-core optical fiber used in an optical amplifier repeater according to the embodiment.

More specifically, in the optical amplifier repeater system 15, the number of modes M propagated through the optical fibers 111-1 to 111-P is four, and the multi-mode multi-core converter 279 included in the optical amplifier repeater 565 is a multi-mode multi-core converter that converts a light beam in M propagation modes (M is four) transmitted through the optical fiber 111-$p$ (p is an integer of one or more and P−1 or less) into N single-mode light beams (N is four), and inputs these single-mode light beams into respective four cores of a multi-core optical fiber illustrated in FIG. 13. These four cores are used as optical transmission lines 101-1 to 101-4. The optical amplifier repeater 565 includes a multi-core WDM coupler 291 combining light beams having wavelengths different from the optical signal bands, on the N optical transmission lines 101-1 to 101-4 (N is four). The pumping light sources 151-1 to 151-4 output pumping light beams having the wavelengths different from the optical signal bands. The multi-core WDM coupler 291 optically couples the pumping light beams output from the pumping light sources 151-1 to 151-4 to the optical transmission lines 101-1 to 101-4, and the backward Raman scattering effect causes the optical intensities of the optical signal bands transmitted through the optical transmission lines 101-1 to 101-4 to be Raman-amplified. The amplification amount by the Raman amplification is set in accordance with the characteristic difference in the optical signals passing through the optical transmission lines 101-1 to 101-4 of N single-mode light beams (N is four). The optical signals are simultaneously amplified by the simultaneous pumped multi-core optical amplifier 121 and are transmitted again through the optical fiber 111-2.

Figure 23:
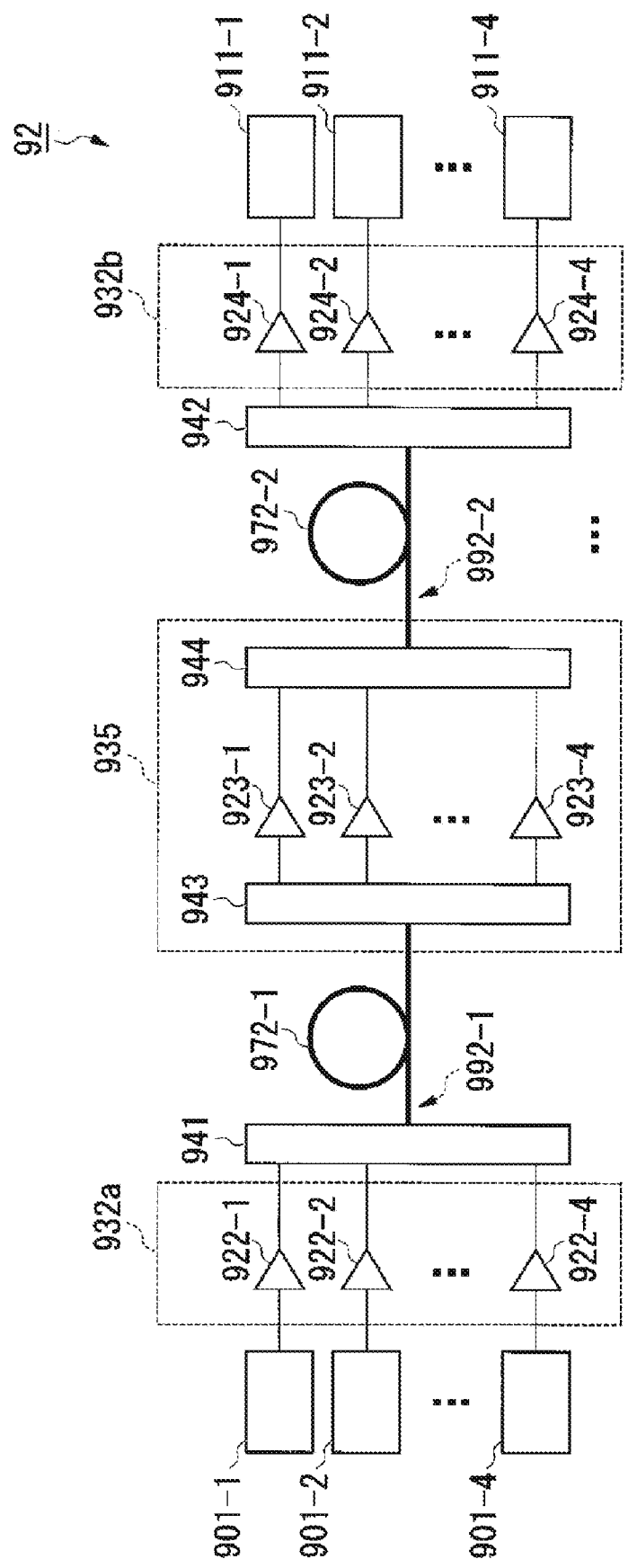
FIG. 23 is a diagram illustrating an example of a conventional optical amplifier repeater system.
Figure 24:
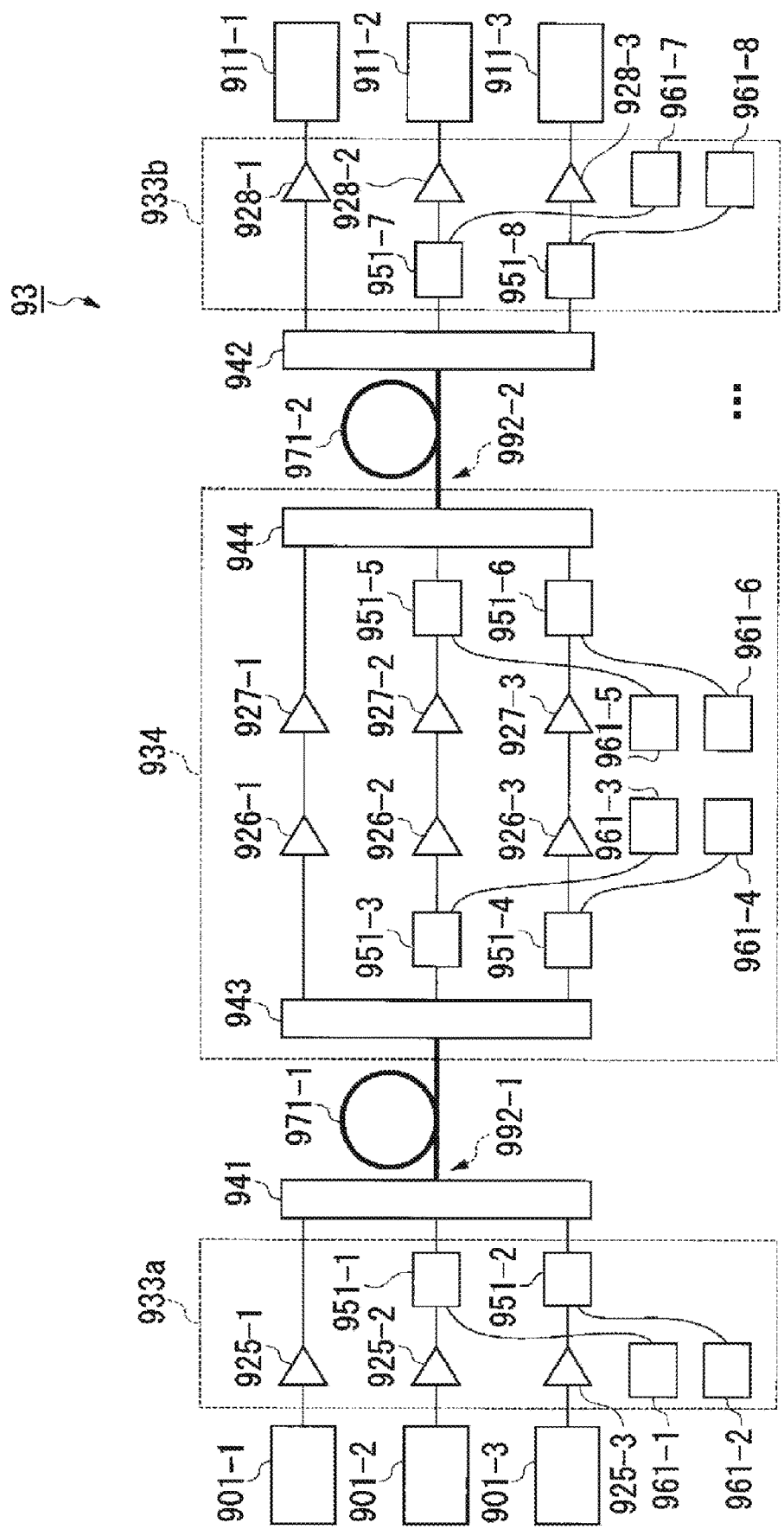
FIG. 24 is a diagram illustrating an example of a conventional optical amplifier repeater system.

FIG. 13 is a diagram illustrating a cross section of a multi-core optical fiber used in the optical amplifier repeater 565 according to the present embodiment. In the present embodiment, a multi-core optical fiber having four cores 401-1 to 401-4 in one optical fiber is used as the optical transmission lines 101-1 to 101-4 of N single-mode light beams (N is four). This multi-core optical fiber has the same configuration as the coupled core fiber 972 used in the related art illustrated in FIG. 23, for example. The N cores 401-1 to 401-N (N is four) are disposed in a cladding 421 covered by a coating 431. The cores 401-1 to 401-4 are close in distance to each other, and thus, during a long distance transmission, a light beam transmitted through each of the cores 401-1 to 401-4 may escape and couple to a light beam transmitted through another core, or a light beam coupled between the cores 401-1 to 401-4 may be generated. The simultaneous pumped multi-core optical amplifier 121 may amplify these coupled light beams by simultaneous pumping, or the single-mode light beams transmitted through the respective cores 401-1 to 401-4 may be input to different optical fibers, and the simultaneous pumped multi-core optical amplifier 121 may amplify the light beams transmitted through the optical fibers by simultaneous pumping. Note that when optical signals are input into a coupled core type multi-core fiber and are transmitted over a long distance, the optical signals are coupled to each other during propagation, serving as a pseudo multi-mode transmission. Thus, a coupled core type multi-core fiber can also be used as the optical fiber 111 as the transmission medium.

The multi-core WDM coupler 291 included in the optical amplifier repeater 565 simultaneously wavelength-multiplexes the light beams in the four cores of the multi-core optical fiber illustrated in FIG. 13. The fan-in device 201 connects four single-mode optical fibers to the 4-core multi-core optical fiber having the four cores 401-1 to 401-4. The multi-core WDM coupler 291 uses the fan-in device 201 to input Raman pumping light beams output by the pumping light sources 151-1 to 151-4 into the individual cores 401-1 to 401-4 used as the optical transmission lines 101-1 to 101-4. As the simultaneous pumped multi-core optical amplifier 121, a cladding pumped multi-core optical amplifier having four cores is disposed after a transmission port of the multi-core WDM coupler 291. After the simultaneous pumped multi-core optical amplifier 121 simultaneously amplifies the light beams in the four cores 401-1 to 401-4, the multi-core multi-mode converter 289 performs multi-core-multi-mode conversion from N single-mode light beams (N is four) into a light beam in M propagation modes (M is four). In this manner, after being amplified and relayed by the optical amplifier repeater 565, the optical signal is transmitted through the subsequent optical fiber 111-($p$+1).

Sixth Embodiment

Figure 14:
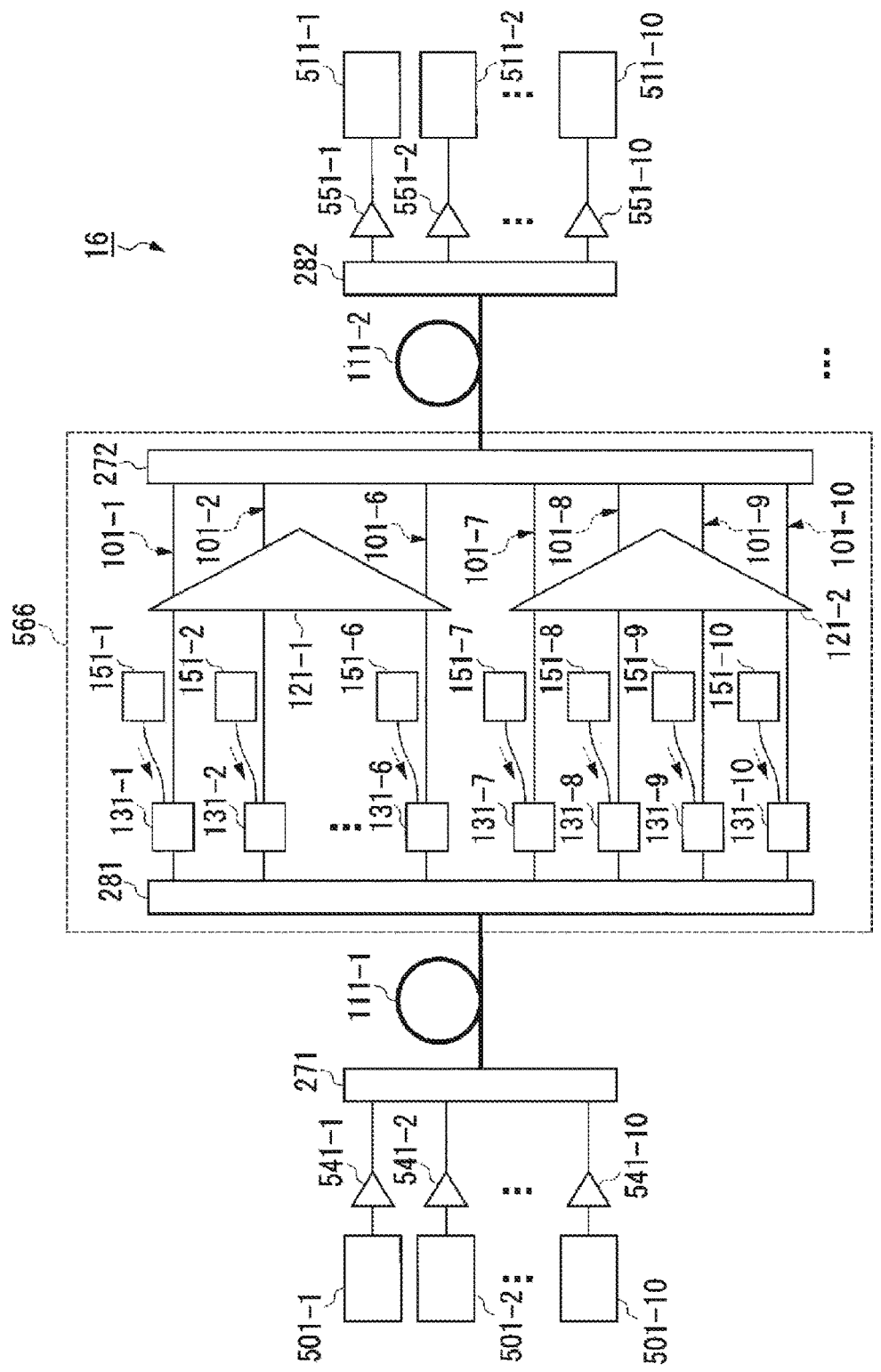
FIG. 14 is a schematic configuration diagram of an optical amplifier repeater system according to a sixth embodiment.

FIG. 14 is a configuration diagram of an optical amplifier repeater system 16 according to the present embodiment. In the figure, the same components as those of the optical amplifier repeater system 14 according to the fourth embodiment illustrated in FIG. 7 are denoted by the same reference signs and descriptions thereof are omitted. The optical amplifier repeater system 16 according to the present embodiment differs from the optical amplifier repeater system 14 according to the fourth embodiment illustrated in FIG. 7 in that the optical amplifier repeater system 16 includes an optical amplifier repeater 566 in place of the optical amplifier repeater 564. Both the numbers of optical transmitters 501 and optical receivers 551 are ten. The optical amplifier repeater 566 differs from the optical amplifier repeater 564 according to the fourth embodiment is that two simultaneous pumped multi-core optical amplifiers 121 are used. The optical amplifier repeater 564 includes the multi-mode optical demultiplexer 281, the wavelength multiplexers 131-1 to 131-10, the pumping light sources 151-1 to 151-10, the simultaneous pumped multi-core optical amplifiers 121-1 and 121-2, and the multi-mode optical multiplexer 272.

More specifically, in the optical amplifier repeater system 16, the number of modes M propagated through the optical fibers 111-1 to 111-P (P is two in the figure) is ten, and the multi-mode optical demultiplexer 281 multiplexes and demultiplexes a light beam in M propagation modes (M is ten) transmitted through the optical fiber 111-$p$ ($p$ is an integer of one or more and P−1 or less) into N single-mode light beams (N is ten). In the optical amplifier repeater 566, on N optical transmission lines 101-$n$ (N is ten and n is an integer of one or more and N or less), the wavelength multiplexers 131-$n$ combining light beams having wavelengths different from the optical signal bands are provided, and the pumping light sources 151-$n$ outputting pumping light beams having the wavelengths different from the optical signal bands Raman-amplify the optical intensities of the optical signal bands. The amplification amount by the Raman amplification is set in accordance with the characteristic difference in the optical signals passing through the optical transmission lines 101-1 to 101-10 of N single-mode light beams (N is ten).

The simultaneous pumped multi-core optical amplifier 121-1 simultaneously amplifies the optical signals Raman-amplified by the respective wavelength multiplexers 131-1 to 131-6 combining the pumping light beams, and the simultaneous pumped multi-core optical amplifier 121-2 simultaneously amplifies the optical signals Raman-amplified by the respective wavelength multiplexers 131-7 to 131-10 combining the pumping light beams. The multi-mode optical multiplexer 272 multiplexes the six single-mode light beams amplified by the simultaneous pumped multi-core optical amplifier 121-1 and the four single-mode light beams amplified by the simultaneous pumped multi-core optical amplifier 121-2 into a mode-multiplexed light beam in which M propagation modes (M is ten) are multiplexed, and outputs the resultant to the optical fiber 111-($p$+1). In this manner, a large difference from the fourth embodiment is in that a plurality of the multi-core optical amplifiers are used. In general, the more the number of cores in a multi-core optical amplifier, the more the power and integration per channel are improved. On the other hand, a multi-core optical amplifier having a smaller number of channels is easier to make. As such, many general-purpose multi-core optical amplifiers can be mass-produced to be used in combination depending on the number of channels required as in the present embodiment.

Seventh Embodiment

Figure 15:
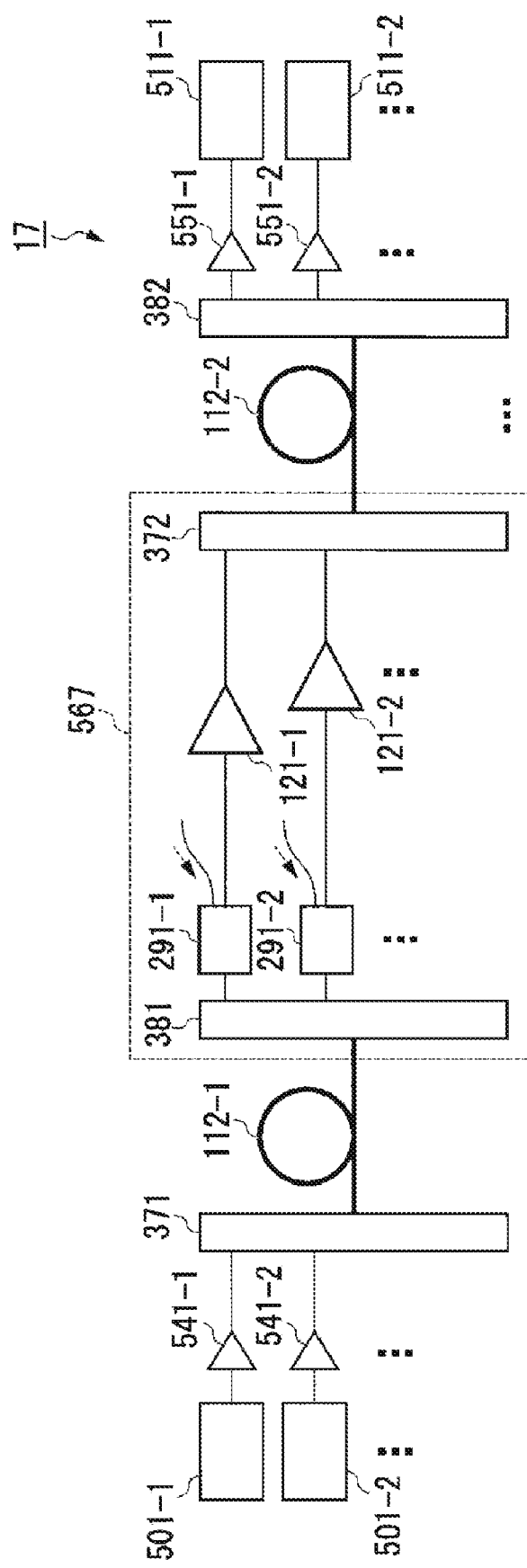
FIG. 15 is a schematic configuration diagram of an optical amplifier repeater system according to a seventh embodiment.

FIG. 15 is a configuration diagram of an optical amplifier repeater system 17 according to the present embodiment. In the figure, the same components as those of the optical amplifier repeater system 15 according to the fifth embodiment illustrated in FIG. 12 are denoted by the same reference signs and descriptions thereof are omitted. The optical amplifier repeater system 17 according to the present embodiment differs from the optical amplifier repeater system 15 according to the fifth embodiment illustrated in FIG. 12 in that the optical amplifier repeater system 17 includes optical fibers 112-1 to 112-P, a multi-core multi-mode multiplexer 371, an optical amplifier repeater 567, and a multi-core multi-mode demultiplexer 382 in place of the optical fibers 111-1 to 111-P, the multi-mode optical multiplexer 271, the optical amplifier repeater 565, and the multi-mode optical demultiplexer 282, respectively.

The optical fiber 112 is a multi-core multi-mode optical fiber of which each core is for propagating a plurality of modes. The optical amplifier repeater 567 includes a multi-core multi-mode demultiplexer 381, multi-core WDM couplers 291-1, 291-2, . . . , simultaneous pumped multi-core optical amplifiers 121-1, 121-2, . . . , and a multi-core multi-mode multiplexer 372.

Figure 16:
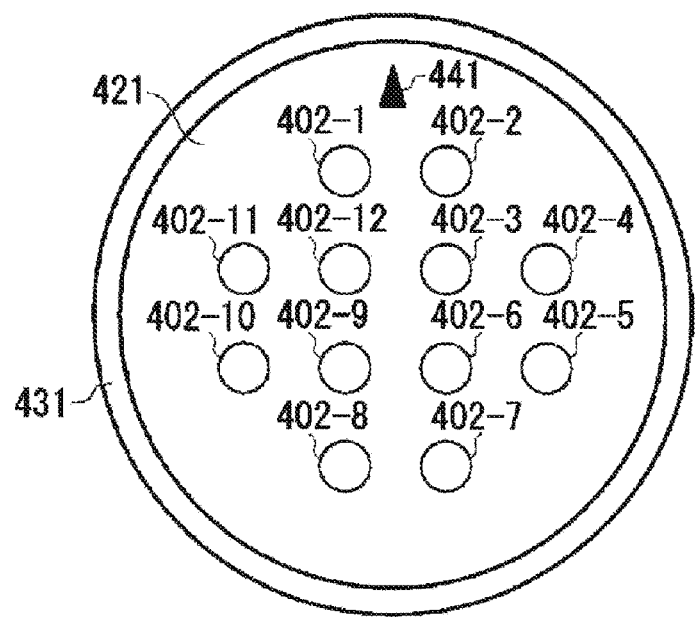
FIG. 16 is a diagram illustrating a cross section of an optical fiber according to the embodiment.

FIG. 16 is a diagram illustrating a cross section of the optical fiber 112 according to the present embodiment. In the present embodiment, as illustrated in the figure, the N-core optical fiber 112 (N is 12) is used in which cores 402-1 to 402-N are disposed in the cladding 421 covered by the coating 431. The optical fiber 112 includes a marker 441 for alignment when the multi-core optical fibers are connected to each other. Each core 402 propagates the modes the number M of which is three.

The optical fiber amplifier 541-$i$ (i is an integer of one or more and N×M or less) illustrated in FIG. 15 amplifies a light beam output by the optical transmitter 501-$i$. The multi-core multi-mode multiplexer 371 mode-multiplexes the signal light beams three by three with the number of modes M being three, and inputs the N mode-multiplexed optical signals in which the modes are multiplexed to the respective cores 402-1 to 402-N of the optical fiber 112. For example, the multi-core multi-mode multiplexer 371 mode-multiplexes the light beams that are amplified by the optical fiber amplifier 541-(M(n−1)+1) to 541-(M×n) (n is an integer of one or more and N or less) with the number of modes being M, and inputs the resultant to the core 402-*n*.

The multi-core multi-mode demultiplexer 381 in the optical amplifier repeater 567 converts the multi-mode optical signal with the number of modes being M transmitted through each of the cores 402-1 to 402-N of the optical fiber 112-*p* (p is an integer of one or more and P−1 or less) into M single-mode light beams, and inputs the respective single-mode light beams into the N multi-core fibers having M cores. The respective single-mode light beams are input to different cores. Similar to the multi-core WDM coupler 291 according to the fifth embodiment, the multi-core WDM couplers 291-1, 291-2, . . . use the fan-in device 201 to input Raman pumping light beams output from the plurality of pumping light sources 151 into the individual cores of the multi-core fibers, and perform the backward Raman amplification. Note that in FIG. 15, the fan-in device 201 and the pumping light sources 151 are omitted.

The simultaneous pumped multi-core optical amplifier 121-*n* (n is an integer of one or more and N or less) simultaneously amplifies the light beams transmitted through the M cores in each of n multi-core fibers that are Raman-amplified by the multi-core WDM coupler 291-*n*. The multi-core multi-mode multiplexer 372 mode-multiplexes the amplified light beams transmitted through the M cores of each multi-core fiber with the number of modes being M, and inputs the mode-multiplexed optical signals to the respective cores 402-1 to 402-12 of the optical fiber 112-(*p*+1). The multi-core multi-mode demultiplexer 382 converts the multi-mode optical signal transmitted through each of the cores 402-1 to 402-N of the optical fiber 112-P into single-mode light beams, and outputs the single-mode light beams into the respective optical fiber amplifiers 551-1, 551-2, . . . . As described above, the present embodiment illustrates an embodiment that is applied to a multi-core multi-mode optical fiber transmission system. The core or mode used in the present embodiment is an example, and combinations thereof are optional. The simultaneous pumped multi-core optical amplifier is used to simultaneously pump the optical signals of a plurality of channels while applying a basic configuration illustrated in the first to fourth embodiments to adjust the optical intensities of the individual cores or modes, and thereby, a long-distance and high-capacity optical amplifier repeater system that is with low power and high integration, and excellent in the transmission characteristics is achieved.

Eighth Embodiment

In the present embodiment, the optical amplifier used in the optical amplifier repeater system is described.

Figure 17:
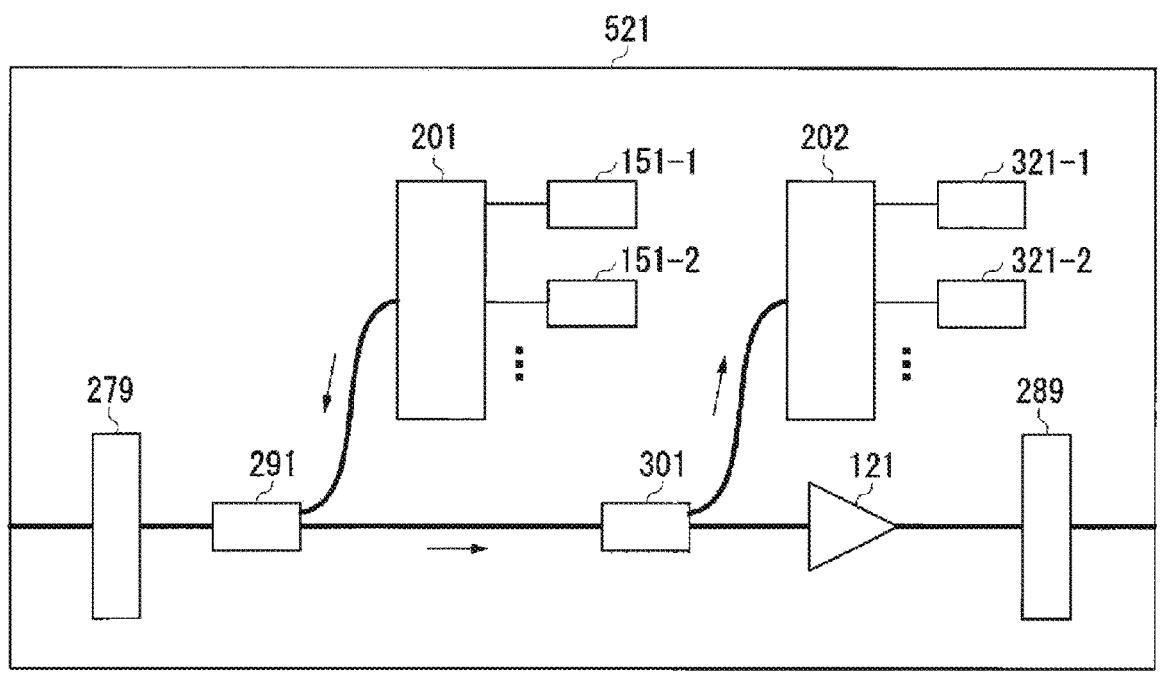
FIG. 17 is a schematic configuration diagram of a high-capacity optical amplifier according to an eighth embodiment.

FIG. 17 is a schematic configuration diagram of a high-capacity optical amplifier 521 according to an eighth embodiment. In the figure, the same components as those of the optical amplifier repeater 565 included in the optical amplifier repeater system 15 illustrated in FIG. 12 are denoted by the same reference signs and descriptions thereof are omitted. The high-capacity optical amplifier 521 includes the multi-mode multi-core converter 279, the pumping light sources 151-1, 151-2, . . . , the fan-in (FI) device 201, a multi-core WDM coupler 291, a multi-core optical tap 301, a fan-out device 202, light monitors 321-1, 321-2, . . . , the simultaneous pumped multi-core optical amplifier 121, and the multi-core multi-mode converter 289.

After the Raman amplification by the multi-core WDM coupler 291, the multi-core optical tap 301 branches the single-mode light beams transmitted through the plurality of cores of the multi-core optical fiber, and inputs the resultant to the respective cores of the multi-core optical fiber between the multi-core optical tap 301 and the fan-out device 202. The fan-out device 202 separates the single-mode optical signals input to the respective cores of the multi-core optical fiber and outputs the signals to the single-mode fibers between the fan-out device 202 and the light monitors 321-1, 321-2, . . . . The respective light monitors 321-1, 321-2, . . . measure the branched optical intensities. Based on this measurement result, an amount to be Raman-amplified before input to the simultaneous pumped multi-core optical amplifier 121, that is, the intensities of the pumping light beams generated by the pumping light sources 151-1, 151-2, . . . are adjusted.

Figure 18:
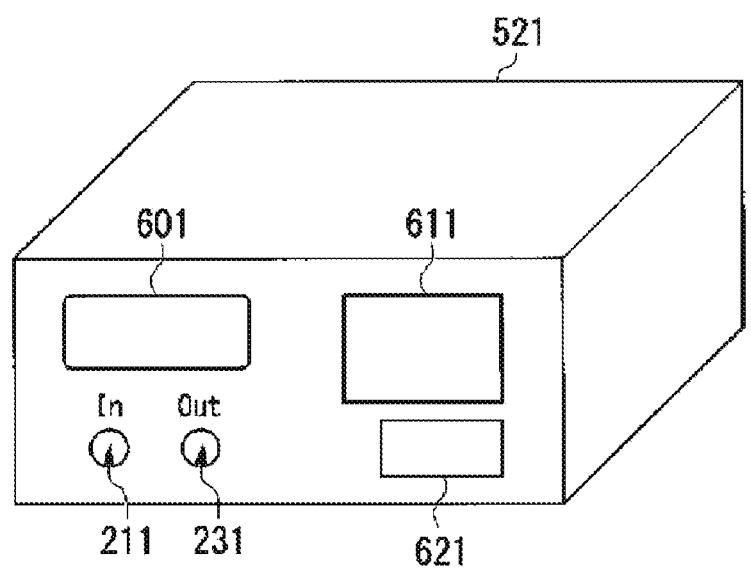
FIG. 18 is a diagram illustrating an outer appearance of the high-capacity optical amplifier according to the embodiment.

The components as illustrated in in FIG. 17 are housed in a device as illustrated in FIG. 18 to fabricate an optical amplifier repeater compatible with the optical amplifier repeater system. This optical amplifier repeater is introduced into an optical transmission system to achieve the optical amplifier repeater system according to the present embodiment.

FIG. 18 is a diagram illustrating an outer appearance of the high-capacity optical amplifier 521. A housing of the high-capacity optical amplifier 521 includes a display screen 601, an operating panel 611 that inputs user operations into the high-capacity optical amplifier 521, a power switch 621, an input port 211 having N cores, and an output port 231 having N cores. By using some of the components disclosed in the present embodiment as a device in this manner, application to the actual system can be facilitated.

Ninth Embodiment

In the present embodiment, an example of an optical communication system is described to which the optical amplifier repeater systems and optical amplifiers according to the first to eighth embodiments are applied.

Figure 19:
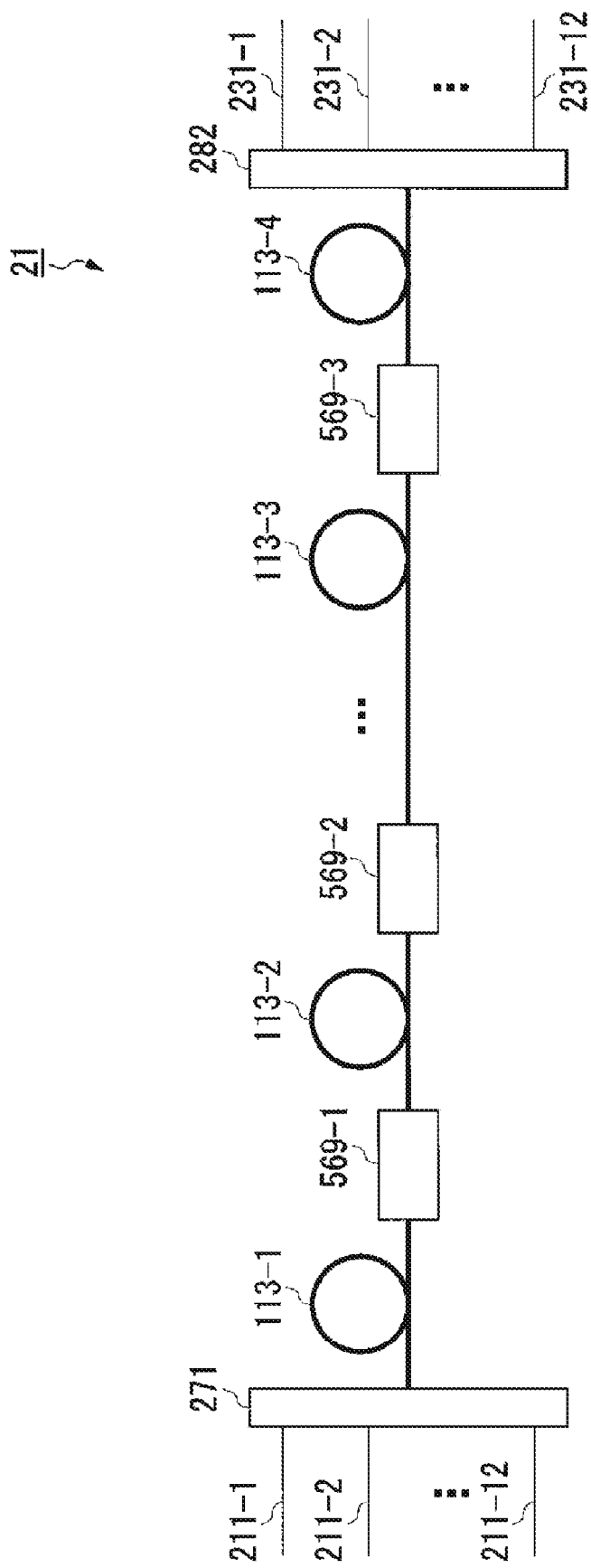
FIG. 19 is a schematic diagram of an optical communication system according to a ninth embodiment.

FIG. 19 is a schematic diagram of an optical amplifier repeater system 21 according to a ninth embodiment. As illustrated in the figure, the optical amplifier repeater system 21 is an optical communication system that includes optical fibers 113-1 to 113-P and optical amplifier repeaters 569-1 to 569-Q. Each of P and Q is an integer of one or more, and the figure illustrates a case where P is four and Q is three, as an example. The optical fiber 113 is the optical fiber 111 or 112 according to the embodiments described above, and the optical amplifier repeater 569 is any of the optical amplifier repeaters 561 to 568 according to the embodiments described above. The multi-mode optical multiplexer 271 receives light beams transmitted through the optical transmission lines 101-1 to 101-N from the input ports 211-1 to 211-N and inserts the light beams into the respective cores of the optical fiber 113-1. The figure illustrates a case where N is 12, as an example. The light beams of the respective cores after propagated through the optical fiber 113-1 are amplified by the optical amplifier repeater 569-1. After that, a process is sequentially repeated in which the light beams of the respective cores propagated through the optical fiber 113-*p* (p is an integer of one or more and P or less) are amplified by the high-capacity optical amplifier repeater 561-*q* (q is an integer of one or more and Q or less) in the subsequent stage. The multi-mode optical demultiplexer 282 outputs the light beams of the respective cores of the optical fiber 113-P to the output ports 231-1 to 231-N. Q may be greater than P. For example, P is 3 and Q is 4. P may be equal to Q.

In this manner, in the present embodiment, the optical fiber 113 and the optical amplifier repeater 569 are used as basic units, and the optical signal is repeatedly relayed multiple times. Although the example in which the present embodiment is applied to a point-to-point optical communication system is illustrated as the simplest example of the optical amplifier repeater system 21 according to the present embodiment, the present embodiment is obviously useful also in more complex optical communication systems such as network nodes.

Tenth Embodiment

In the present embodiment, an example of an optical communication system is described to which the optical amplifier repeater systems and optical amplifier repeaters according to the first to eighth embodiments are applied.

Figure 20:
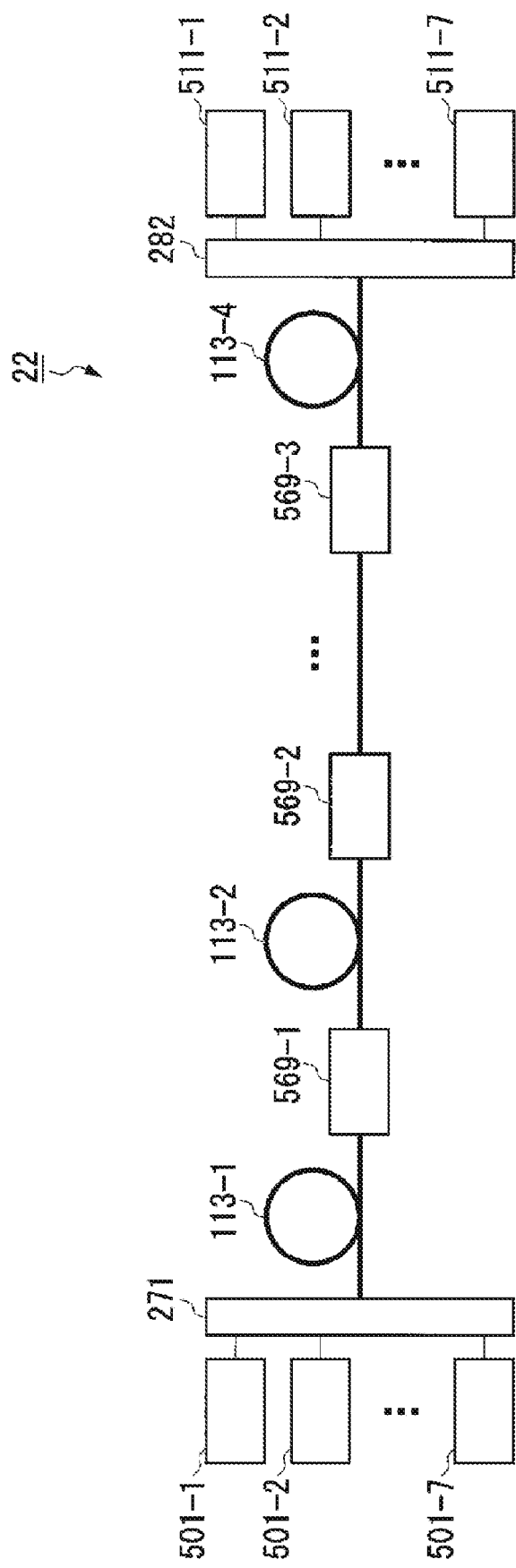
FIG. 20 is a schematic diagram of an optical communication system according to a tenth embodiment.

FIG. 20 is a schematic diagram of an optical amplifier repeater system 22 according to a tenth embodiment. In the figure, the same components as those of the optical amplifier repeater system 21 according to the ninth embodiment illustrated in FIG. 19 are denoted by the same reference signs and descriptions thereof are omitted. As illustrated in the figure, the optical amplifier repeater system 22 is an optical communication system that includes the optical transmitters 501-1 to 501-7, the multi-mode optical multiplexer 271, the optical fibers 113-1 to 113-P, the optical amplifier repeaters 569-1 to 569-Q, the multi-mode optical demultiplexer 282, and the optical receivers 511-1 to 511-7. Each of P and Q is an integer of one or more, and the figure illustrates a case where P is four and Q is three, as an example. The multi-mode optical multiplexer 271 mode-multiplexes optical signals generated by the respective optical transmitters 501-1 to 501-6, and inputs the resultant to the optical fiber 113-1. The multi-mode optical demultiplexer 282 receives the optical signal multiplexed in a plurality of propagation modes input from the optical fiber 113-P, and demultiplexes the signal into seven single-mode light beams. The optical receivers 511-1 to 511-7 receive the single-mode light beams obtained by demultiplexing the signal by the multi-mode optical demultiplexer 282.

In this manner, in the present embodiment, the optical fiber 113 and the optical amplifier repeater 569 are used as basic units, and the optical signal is repeatedly relayed multiple times. Although the example in which the present embodiment is applied to a point-to-point optical communication system is illustrated as the simplest example of the optical amplifier repeater system 22 according to the present embodiment, the present embodiment is obviously useful also in more complex optical communication systems such as network nodes.

Eleventh Embodiment

In the present embodiment, optical signals transmitted in the first to tenth embodiments are described.

Figure 21:
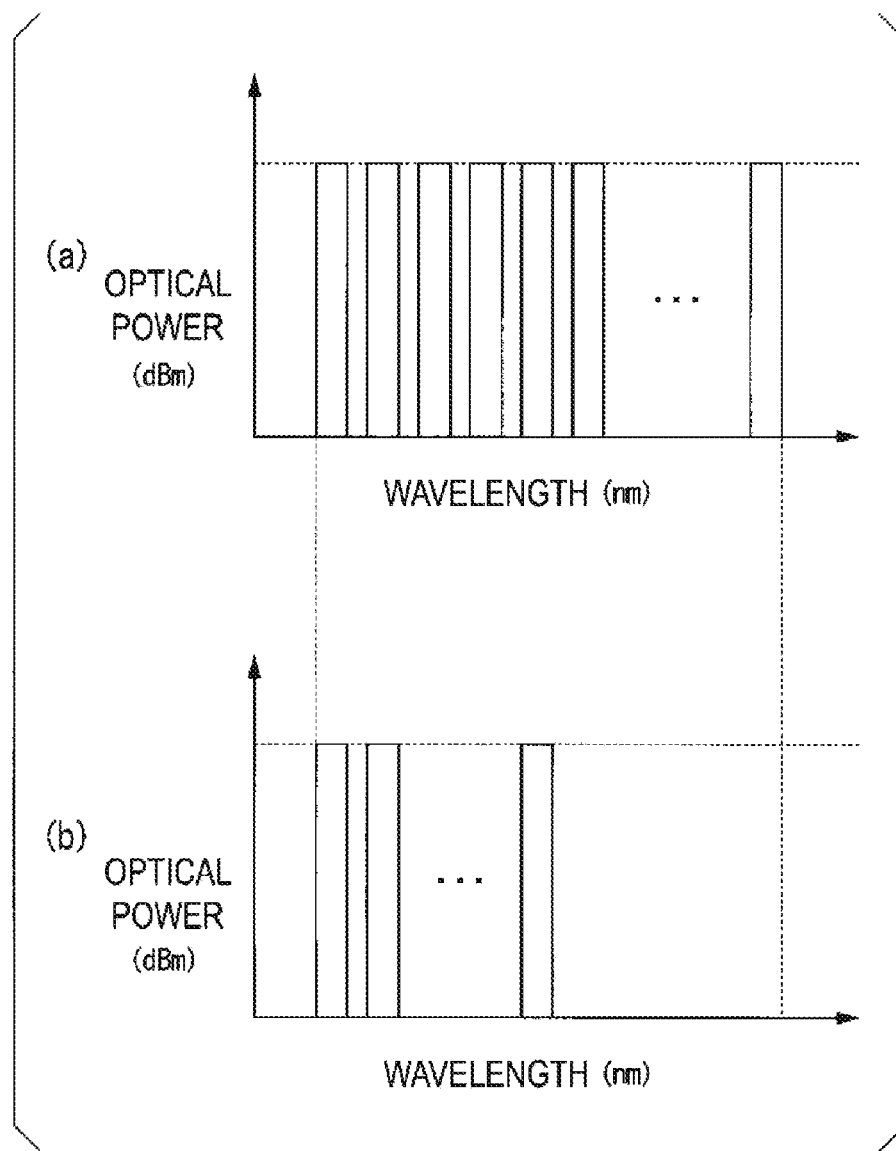
FIG. 21 is a diagram illustrating an example of an optical signal according to an eleventh embodiment.
Figure 22:
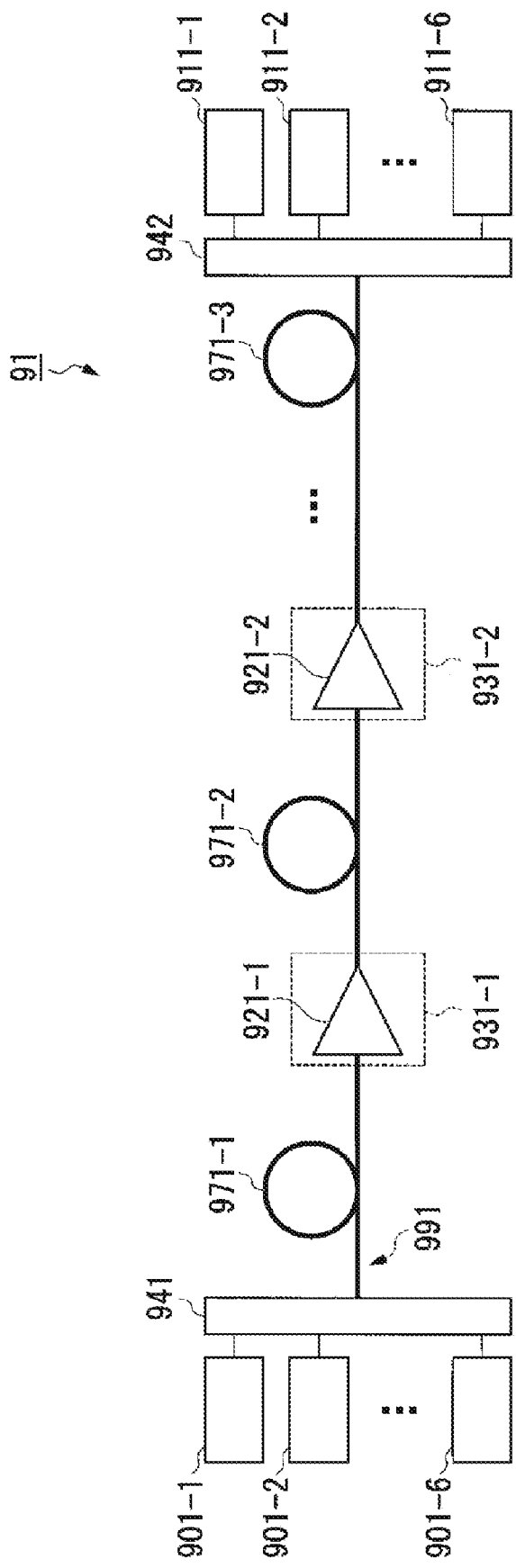
FIG. 22 is a diagram illustrating an example of a conventional optical amplifier repeater system.

FIG. 21 is a diagram illustrating signals of one spatial channel. As illustrated in FIG. 21(a), basically, it is assumed that in all the spatial channels, a plurality of wavelengths of signals are transmitted side-by-side so that the wavelength bands used are substantially filled. The spatial channel corresponds to the mode 1 through the mode 6, for example, in the first embodiment.

However, it is thought that the required capacity varies in the transition phase from the conventional single-mode optical fiber communication system to the spatial multiplexed optical fiber communication system and also varies, after the transition phase, depending on the time or time period. Thus, the maximum capacity for use of the full wavelength bands in all the spatial channels seems to be not required. In this case, as illustrated in FIG. 21(b), there is a possibility that spatial channels having signals in only some of the available wavelength bands may be mixed. In this case, by applying the present embodiment, even in a case of optical signals of which the optical powers are different for each wavelength channel, the characteristics of the wavelength and the spatial channel (mode) can be optimized, and good characteristics can be obtained across all of the channels.

Further, unlike the configuration responding to the demand described above, the number of channels of the wavelength may be intentionally varied between the spatial channels (modes). Specifically, as a larger number of wavelengths are used, the higher power is required and the loss is increased. Thus, the number of wavelengths of the spatial channel (mode) in which optical power is less likely to be output may be reduced less than other spatial channels (modes). In this way, due to imbalance in the wavelength channels, in amplifying by a simultaneous pumped optical amplifier, the spatial channel in which optical power is less likely to be output can have leeway, and a more uniform characteristic can be easily obtained as a whole of the system.

OTHER EMBODIMENTS

Note that the above described aspects each illustrate one aspect of the present disclosure, and the present disclosure is not limited to the embodiments described above, and variations and modifications within the scope that includes the configuration of the present disclosure and can achieve objects and effects are included in the contents of the present disclosure. Moreover, the specific structure and shape and the like in the implementation of the present disclosure may be unproblematically other structures, shapes, and the like within the scope capable of achieving the object and effect of the present disclosure. The present disclosure is not limited to the embodiments described above, and variations and modifications within the scope capable of achieving the object of the present disclosure are included in the present disclosure.

According to the embodiment described above, in the optical amplifier repeater system using the optical fiber communication scheme in which the communication capacity is increased by mode division multiplexing, a plurality of optical amplifiers are integrated and the simultaneous pumped multi-core optical amplifier capable of consuming lower power than the conventional optical amplifiers is used. Furthermore, the simultaneous pumped multi-core optical amplifier can be applied to the mode-multiplexing transmission by compensating the inter-mode loss difference generated in the multi-mode optical transmission line by the methods of the first to third embodiments, or by compensating by the Raman distributed amplification as in the fourth embodiment. This makes it possible to achieve the long-distance and high-capacity optical amplifier repeater system while reducing the cost and the power consumption.

According to the embodiment described above, the optical amplifier repeater system includes an optical fiber propagating a light beam in a plurality of propagation modes and an optical amplifier repeater amplifying the light beam propagated through the optical fiber. For example, the optical fiber includes the optical fibers 111 and 112, and the optical amplifier repeater includes the optical amplifier repeaters 561, 562, 563, 564, 565, and the high-capacity optical amplifier 521. The optical amplifier repeater includes an optical demultiplexer, an optical amplifier, an optical multiplexer, and an optical intensity adjusting unit. The optical demultiplexer demultiplexes a light beam in a plurality of propagation modes propagated through the optical fiber into a plurality of single-mode light beams. The optical demultiplexer includes the multi-mode optical demultiplexer 281, the multi-mode multi-core converter 279, and the multi-core multi-mode demultiplexer 381, for example. The optical amplifier amplifies, by simultaneous pumping, intensities of the plurality of single-mode light beams using a light beam generated by one pumping light source. For example, the optical amplifier includes the simultaneous pumped multi-core optical amplifier 121 and the pumping light source includes the pumping light source 461. The optical multiplexer multiplexes the plurality of single-mode light beams amplified by the optical amplifier into a light beam in a plurality of propagation modes. The optical multiplexer includes the multi-mode optical multiplexer 272, the multi-core multi-mode converter 289, and the multi-core multi-mode multiplexer 372, for example. The optical intensity adjusting unit performs adjustment by amplifying, attenuating, or otherwise processing the intensities of the plurality of single-mode light beams at least one of before or after the amplification by the optical amplifier. The optical intensity adjusting unit performs the adjustment by amplifying or attenuating the optical intensities of the single-mode light beams transmitted through optical paths, individually for the respective optical paths through which the plurality of single-mode light beams are propagated. For example, the optical intensity adjusting unit amplifies or attenuates the optical intensity of the single-mode light beam transmitted through each optical path to compensate for a loss difference between the optical paths. The optical intensity adjusting unit may perform the adjustment to reduce a difference in optical intensity between the optical paths, or may perform the adjustment to obtain the optical intensity in accordance with the wavelength channel used in each optical path. The optical intensity adjusting unit includes the variable optical intensity attenuator 181, the waveform shaper 191, the individual pumped multi-core optical amplifier 129, the wavelength multiplexer 131 and the pumping light source 151, the multi-core WDM coupler 291, and the pumping light source 151, for example.

The optical intensity adjusting unit may adjust the optical intensities of the plurality of single-mode light beams by amplifying the optical intensities using a multi-channel optical amplifier, or by amplifying the optical intensities using a distributed Raman amplification. The optical amplifier repeater system may include, on a plurality of optical paths, an optical tap branching some of the optical intensities of the single-mode light beams propagated through the optical paths, wherein the optical intensity adjusting unit may adjust the intensities of the plurality of single-mode light beams in accordance with measurement results of the branched optical intensities. The optical tap includes the multi-core optical tap 301, for example.

In a case where the optical fiber propagates a light beam in the propagation modes the number of which is M (M is an integer of two or more), the optical amplifier may be an N-channel cladding-pumped multi-core optical amplifier (N is an integer of two or more and N is equal to or more than M), and the optical intensity adjusting unit may be a core-pumped multi-core optical amplifier.

In the case where the optical fiber propagates a light beam in the propagation modes the number of which is M (M is an integer of two or more), the optical demultiplexer demultiplexes the light beam in M propagation modes into N single-mode light beams (N is an integer of two or more), and the optical multiplexer multiplexes the N single-mode light beams amplified by the optical amplifier into the light beam in the M propagation modes. In this case, the optical intensity adjusting unit may include a Raman amplification pumping light source (for example, the pumping light source 151) and a Raman amplification wavelength multiplexer (for example, the wavelength multiplexer 131 and the multi-core WDM coupler 291). The Raman amplification pumping light source outputs a pumping light beam having a wavelength different from an optical signal band of each of the single-mode light beams. The Raman amplification wavelength multiplexer, on each of the optical paths through which the respective N single-mode light beams are propagated, combines the light beam output by the Raman amplification pumping light source to Raman-amplify an optical intensity of the optical signal band. An amplification amount by the Raman amplification is based on a characteristic difference in the optical paths through which the respective N single-mode light beams are propagated.

Moreover, the plurality of single-mode light beams input to the optical amplifier may be coupled to one another during propagation. The optical fiber may include a plurality of cores propagating the plurality of propagation modes. In this case, the optical intensity adjusting unit adjusts the intensities of the plurality of single-mode light beams to reduce a difference in the optical intensity between the propagation modes and between the cores. Furthermore, the optical amplifier repeater system may include a plurality of optical amplifier repeaters. For example, the optical amplifier repeater includes the optical amplifier repeater 569. The optical amplifier includes a plurality of input ports to each of which one single-mode light beam is input, and the optical demultiplexer outputs the plurality of single-mode light beams obtained by demultiplexing to the plurality of input ports different from each other of the optical amplifier to reduce variations in the optical intensity after amplification by the optical amplifier.

According to the embodiment described above, in an optical amplifier repeater system that performs mode-multiplexed optical transmission using a plurality of modes in a multi-mode fiber, after the modes are separated and the optical intensities are aligned by the optical intensity adjusting means, optical amplification is performed by a simultaneous pumped multi-core optical amplifier. This can achieve an optical amplifier repeater system having a small characteristic variation between channels with a small number of devices and low power.

---

Reference Signs List 11, 12, 13, 14, 15, 16, 17, 21, 22, 91, 92, 93 . . . Optical amplifier repeater system
101-1 to 101-10, 190, 991, 992-1 to 992-2 . . . Optical transmission line
111-1, 111-2, 112-1, 112-2, 113-1 to 113-4 . . . Optical fiber -continued

| Reference Signs List |
|---|
| 121, 121-1, 121-2 . . . Simultaneous pumped multi-core optical amplifier |
| 129 . . . Individual pumped multi-core optical amplifier |
| 131-1 to 131-10, 951-1 to 951-8 . . . Wavelength multiplexer |
| 151-1 to 151-10, 961-1 to 961-8 . . . Pumping light source |
| 171-1 to 171-6 . . . Optical amplifier |
| 181-1 to 181-6 . . . Variable optical intensity attenuator |
| 191-1 to 191-6 . . . Waveform shaper |
| 201 . . . Fan-in device |
| 202 . . . Fan-out device |
| 211, 211-1 to 211-12 . . . Input port |
| 231, 231-1 to 231-12 . . . Output Port |
| 271, 272, 941, 944 . . . Multi-mode optical multiplexer |
| 279 . . . Multi-mode multi-core converter |
| 281, 282, 942, 943 . . . Multi-mode optical demultiplexer |
| 289 . . . Multi-core multi-mode converter |
| 291, 291-1, 291-2 . . . Multi-core WDM coupler |
| 301 . . . Multi-core optical tap |
| 321-1, 321-2 . . . Light monitor |
| 371, 372 . . . Multi-core multi-mode multiplexer |
| 381, 382 . . . Multi-core multi-mode demultiplexer |
| 401-1 to 401-4, 402-1, 402-12 . . . Core |
| 421 . . . Cladding |
| 431 . . . Coating |
| 441 . . . Marker |
| 451 . . . Optical coupler |
| 461 . . . Pumping light source |
| 471-1 to 471-6 . . . Optical amplification medium |
| 501-1 to 501-10, 901-1 to 901-6 . . . Optical transmitter |
| 511-1 to 511-10, 911-1 to 911-6 . . . Optical receiver |
| 521 . . . High-capacity optical amplifier |
| 541-1 to 541-10, 551-1 to 551-10 . . . Optical fiber amplifier |
| 561, 562, 563, 564, 565, 569-1 to 569-3, 931-1 to 931-2, 934, 935 . . . Optical amplifier repeater |
| 601 . . . Display screen |
| 602 . . . Operating panel |
| 621 . . . Power switch |
| 971-1 to 971-3 . . . Multi-mode optical fiber |
| 921-1 to 921-2 . . . Multi-mode optical amplifier |
| 922-1 to 922-4, 923-1 to 923-4, 924-1 to 924-4, 925-1 to 925-3, 926-1 to 926-3, 927-1 to 927-3, 928-1 to 928-3 . . . Optical amplifier |
| 932a, 932b, 933a, 933b . . . Optical amplifier unit |
| 972-1 to 972-2 . . . Coupled core fiber |

The invention claimed is:

1. An optical amplifier repeater system comprising:
an optical fiber configured to propagate a light beam in a plurality of propagation modes; and
an optical amplifier repeater configured to amplify the light beam,
wherein the optical amplifier repeater includes
an optical demultiplexer configured to demultiplex the light beam in the plurality of propagation modes propagated through the optical fiber into a plurality of single-mode light beams,
an optical amplifier configured to amplify, by simultaneous pumping, intensities of the plurality of single-mode light beams using a light beam generated by one pumping light source,
an optical multiplexer configured to multiplex the plurality of single-mode light beams amplified by the optical amplifier into a light beam in the plurality of propagation modes, and
an optical intensity adjuster configured to adjust the intensity of each of the plurality of single-mode light beams at least one of before or after the amplification by the optical amplifier,
wherein the optical intensity adjuster performs the adjustment by amplifying or attenuating the optical intensity of each of the plurality of single-mode light beams in an individual optical path through which the single-mode light beam is propagated the optical amplifier includes a plurality of input ports to each of which one of the plurality of single-mode light beams is input, and
the optical demultiplexer, to reduce variations in the optical intensity after the amplification by the optical amplifier,
outputs, from each of a plurality of output ports, the plurality of single-mode light beams demultiplexed, and
inputs the plurality of single-mode light beams output from each of the plurality of output ports by switching to an input port which is different from another input port of the optical amplifier, the switching being performed in accordance with the plurality of single-mode light beams.

2. The optical amplifier repeater system according to claim 1,
wherein the optical intensity adjuster performs the adjustment by amplifying the optical intensity using a multi-channel optical amplifier, or by amplifying the optical intensity using a distributed Raman amplification.

3. The optical amplifier repeater system according to claim 2, further comprising:
on a plurality of the optical paths, an optical tap configured to branch some of the optical intensities of the plurality of single-mode light beams propagated through the optical paths, wherein the optical intensity adjuster performs the adjustment in accordance with measurement results of the optical intensities that are branched by the optical tap.

4. The optical amplifier repeater system according to claim 2, wherein:
the optical fiber propagates a light beam the number of propagation modes of which is M, M being an integer of two or more;
the optical amplifier is an N-channel cladding-pumped multi-core optical amplifier, N being an integer of two or more and being equal to or more than M; and
the optical intensity adjuster is a core-pumped multi-core optical amplifier.

5. The optical amplifier repeater system according to claim 2, wherein:
the optical fiber propagates a light beam the number of propagation modes of which is M, M being an integer of two or more;
the optical demultiplexer demultiplexes the light beam in the M propagation modes into N single-mode light beams, N being an integer of two or more;
the optical multiplexer multiplexes the N single-mode light beams amplified by the optical amplifier into a light beam in the M propagation modes; and
the optical intensity adjuster includes
a Raman amplification pumping light source configured to output a pumping light beam having a wavelength different from an optical signal band of each of the single-mode light beams, and
a Raman amplification wavelength multiplexer configured to Raman-amplify an optical intensity of the optical signal band by combining the light beam output by the Raman amplification pumping light source on each of the optical paths through which the respective N single-mode light beams are propagated, and
an amplification amount by the Raman amplification is based on a characteristic difference in the optical paths through which the respective N single-mode light beams are propagated.

6. The optical amplifier repeater system according to claim 1, wherein:
the optical fiber includes a plurality of cores propagating a plurality of propagation modes; and
the optical intensity adjuster performs the adjustment to reduce a difference in the optical intensity between the propagation modes and between the cores.

7. The optical amplifier repeater system according to claim 1, comprising a plurality of the optical amplifier repeaters.

* * * * *